(12) United States Patent
Mihara

(10) Patent No.: US 12,175,784 B2
(45) Date of Patent: Dec. 24, 2024

(54) INFORMATION PROCESSING APPARATUS, INFORMATION PROCESSING SYSTEM, AND INFORMATION PROCESSING METHOD

(71) Applicant: Ayumi Mihara, Tokyo (JP)

(72) Inventor: Ayumi Mihara, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 298 days.

(21) Appl. No.: 17/665,587

(22) Filed: Feb. 7, 2022

(65) Prior Publication Data

US 2022/0301332 A1  Sep. 22, 2022

(30) Foreign Application Priority Data

Mar. 22, 2021  (JP) .................................. 2021-047776

(51) Int. Cl.
*G06V 30/40* (2022.01)
*G06Q 10/087* (2023.01)
*G06V 30/412* (2022.01)
*G06V 30/416* (2022.01)
*G06V 30/42* (2022.01)

(52) U.S. Cl.
CPC ......... *G06V 30/412* (2022.01); *G06Q 10/087* (2013.01); *G06V 30/416* (2022.01); *G06V 30/42* (2022.01)

(58) Field of Classification Search
CPC .... G06V 30/412; G06V 30/416; G06V 30/42; G06Q 10/087
See application file for complete search history.

(56) References Cited

U.S. PATENT DOCUMENTS

| 6,798,532 B1* | 9/2004 | Okino ................... G06Q 30/06 |
| | | 358/1.15 |
| 2003/0200057 A1* | 10/2003 | Johnson ................. G06Q 30/02 |
| | | 702/184 |
| 2008/0068647 A1 | 3/2008 | Isobe et al. |
| 2010/0218125 A1 | 8/2010 | Seki |
| 2013/0067368 A1 | 3/2013 | Mihara |
| 2014/0195585 A1 | 7/2014 | Mihara |
| 2015/0082320 A1 | 3/2015 | Hori et al. |
| 2015/0220866 A1 | 8/2015 | Mihara |

(Continued)

FOREIGN PATENT DOCUMENTS

| JP | 2003-196525 | 7/2003 |
| JP | 2005-018208 | 1/2005 |
| JP | 2008-104143 | 5/2008 |

(Continued)

OTHER PUBLICATIONS

Machine translation for JP 2010-049360 (Year: 2010).*

*Primary Examiner* — Qian Yang
(74) *Attorney, Agent, or Firm* — XSENSUS LLP

(57) ABSTRACT

An information processing apparatus includes circuitry that generates transmission guide information according to a second form issued in response to a first form, and registers information representing the second form and first form information in a memory in association with each other. The information representing the second form is transmitted based on the transmission guide information. The first form information is included in first form image data.

22 Claims, 24 Drawing Sheets

(56) References Cited

U.S. PATENT DOCUMENTS

2016/0037010 A1   2/2016   Mihara

FOREIGN PATENT DOCUMENTS

| JP | 2010-049360 | * | 3/2010 |
| JP | 2015-011490 | | 1/2015 |
| JP | 2016-167816 | | 9/2016 |
| JP | 2021-071798 | | 5/2021 |

* cited by examiner

FIG. 4

TENANT:User01(CORPORATION AA) — 210

| NAME | ADDRESS | PHONE NUMBER | ELECTRONIC MAIL ADDRESS | NAME OF CONTACT PERSON | ... | ... |
|---|---|---|---|---|---|---|
| CORPORATION BB | TOKYO, ... | 03-xxxx-xxxx | xx@xx.xx | TARO SUZUKI | ... | ... |

FIG. 5

TENANT:User01(CORPORATION AA) — 220

| ORDER SHEET NUMBER | RECONCILIATION RESULT | CONFIRMATION STATUS | SUPPLIER | ORDER PRICE | ORDER DATE | SUGGESTED DELIVERY DATE | DELIVERY ADDRESS | FORM IMAGE PATH | DESCRIPTION INFORMATION D1 | | | ... |
|---|---|---|---|---|---|---|---|---|---|---|---|---|
| | | | | | | | | | ARTICLE CODE | ARTICLE NAME | QUANTITY | UNIT PRICE | PRICE | ... |
| 190186 | — | UNPROCESSED | CORPORATION BB | 1,790,208 | 2018/05/20 | 2018/08/20 | TOKYO, ... | ⟨path⟩/190186.pdf | 10845 | RECEPTION TABLE | 2 | 59,800 | 119,600 | ... |

FIG. 6

TRANSMISSION TYPE: WEB PAGE — 230

| URL | ORDER SHEET NUMBER | INVOICE IMAGE |
|---|---|---|
| https://xxxxxx/yyyyy | 190185 | 20201023101234567.pdf |
| https://xxxxxx/xxxxx | 190186 | – |

FIG. 7

TRANSMISSION TYPE: ELECTRONIC MAIL — 230A

| ELECTRONIC MAIL ADDRESS | ORDER SHEET NUMBER | INVOICE IMAGE |
|---|---|---|
| yyad987fasf9asf@yy.yy | 190185 | 20201023101234567.pdf |
| yylkj34h523j4h5@yy.yy | 190186 | – |

FIG. 8

| TENANT:User01(CORPORATION AA) | | | | | | | 240 |
|---|---|---|---|---|---|---|---|
| ORDER SHEET NUMBER | PROCESS DATE AND TIME | TOTAL AMOUNT | DESCRIPTION INFORMATION D1 | | | | |
| | | | ARTICLE CODE | ARTICLE NAME | QUANTITY | UNIT PRICE | PRICE |
| 190186 | 2020/08/01 10:00:00 | UN-MATCHED 1,810,208 | MATCHED — | MATCHED — | MATCHED — | UN-MATCHED 69,800 | UN-MATCHED 139,600 |
| ... | ... | ... | ... | ... | ... | ... | ... |

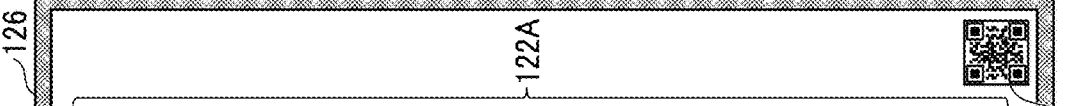

FIG. 13A

ORDER PLACEMENT — 131 yy@yy.yy
TO:xx@xx.xx

ATTACHED FILE: ordersheet.pdf — 126A

Dear xxx xxx,

Thank you for sending us your quotation of xxxx.

After reviewing, we have decided to place an order with your company.
Please find enclosed our purchase order (order sheet).

⎫
⎬ 132
⎭

*The link for uploading the invoice:
https://xxxxxx/xxxxx  ⎫⎬⎭ 133

FIG. 13B

— 135 https://xxxxxx/xxxxx

ORDER INFORMATION

| | |
|---|---|
| ORDER SHEET NUMBER | 190185 |
| SUPPLIER | CORPORATION BB |
| ORDER PRICE | 1,790,208 |
| ORDER DATE | 2018/05/20 |
| SUGGESTED DELIVERY DATE | 2018/06/30 |
| DELIVERY ADDRESS | TOKYO, … |
| DESCRIPTION D1 | …… |

⎫ 134
⎬ 122A
⎭

[SELECT INVOICE TO UPLOAD] — 136

C:¥data¥invoice.pdf — 137

[CANCEL]  [SEND] — 138

FIG. 14A

ORDER PLACEMENT yy@yy.yy
TO: xx@xx.xx

Dear xxx xxx,

Thank you for sending us your quotation of xxxx.

After reviewing, we have decided to place an order with your company.
Please find enclosed our purchase order (order sheet).

*Please send the invoice to the following electronic mail address:
yy・・・・・@yy.yy  } 133A 132 — top bracket
131A

FIG. 14B

ORDER PLACEMENT yyad987fasf9asf@yy.yy  } 133B
TO: xx@xx.xx

Dear xxx xxx,

Thank you for sending us your quotation of xxxx.

After reviewing, we have decided to place an order with your company.
Please find enclosed our purchase order (order sheet).

*Please send the invoice in reply to this electronic mail.  } 139

132 — top bracket
131B

FIG. 16

ORDER SHEET INFORMATION ~122B

| ORDER SHEET NUMBER | 190186 |
| SUPPLIER | CORPORATION BB |
| ORDER PRICE | 1,790,208 ~122a |
| ORDER DATE | 2018/05/20 |
| SUGGESTED DELIVERY DATE | 2018/06/30 |
| DELIVERY ADDRESS | TOKYO, ... |

| | ARTICLE CODE | ARTICLE NAME | QUAN-TITY | UNIT PRICE | PRICE |
|---|---|---|---|---|---|
| DESCRIP-TION D1 | 10845 | RECEP-TION TABLE | 2 | 59,800 | 119,600 |
| | ...... | | | 122b | 122c |

INVOICE IMAGE ~171

~172

INVOICE
TO: CORPORATION AA
  INVOICE DATE: JULY 20, 2018
  CORPORATION BB
PAYMENT METHOD: Please pay by transfer to the account below.
  PAYMENT DUE DATE: AUGUST 20, 2018
Please proceed with the payment as follows:
CUSTOMER NUMBER    AI-4567-89
INVOICE NUMBER     A123-03
CUTOFF DATE        JUNE 30, 2018
TOTAL INVOICE AMOUNT  ¥1,810,208 ~172a
CONSUMPTION TAX       ¥132,608
CC BANK  BRANCH ABC  ACCOUNT TYPE: CHECKING
ACCOUNT NUMBER 1111111  ACCOUNT HOLDER CORP BB

| ARTICLE CODE | ARTICLE NAME | QUAN-TITY | UNIT PRICE | PRICE |
|---|---|---|---|---|
| 10845 | RECEPTION TABLE | 2 | ¥69,800 | ¥139,600 |
| 22563 | OFFICE DESK | 14 | ¥14,800 | ¥207,200 |
| 00562 | CHAIR | 14 | ¥36,800 | ¥515,200 |
| 41523 | CABINET | 10 | ¥59,800 | ¥598,000 |
| 20783 | SHREDDER | 2 | ¥19,800 | ¥39,600 |
| 30856 | REFRIGERATOR | 2 | ¥89,000 | ¥178,000 |
| | | | SUBTOTAL | ¥1,677,600 |

172b   172c

RECONCILIATION RESULT ~173

~173a

| | ORDER INFORMATION | INVOICE INFORMATION |
|---|---|---|
| ☑ TOTAL AMOUNT | 1,790,208 | 1,810,208 |
| ☐ D1 ARTICLE NAME | RECEPTION TABLE | |
| ☐ D1 QUANTITY | 2 | |
| ☑ D1 UNIT PRICE | 59,800 | 69,800 |
| ☑ D1 PRICE | 119,600 | 139,600 |
| ☐ D2 ARTICLE NAME | ...... | OFFICE DESK |

NOTES ~173b
The unit price ¥69,800 of the reception table is ¥10,000 higher than that in the order.

[CANCEL]  [TEMPORARILY SAVE] ~174  [CONFIRM] ~175

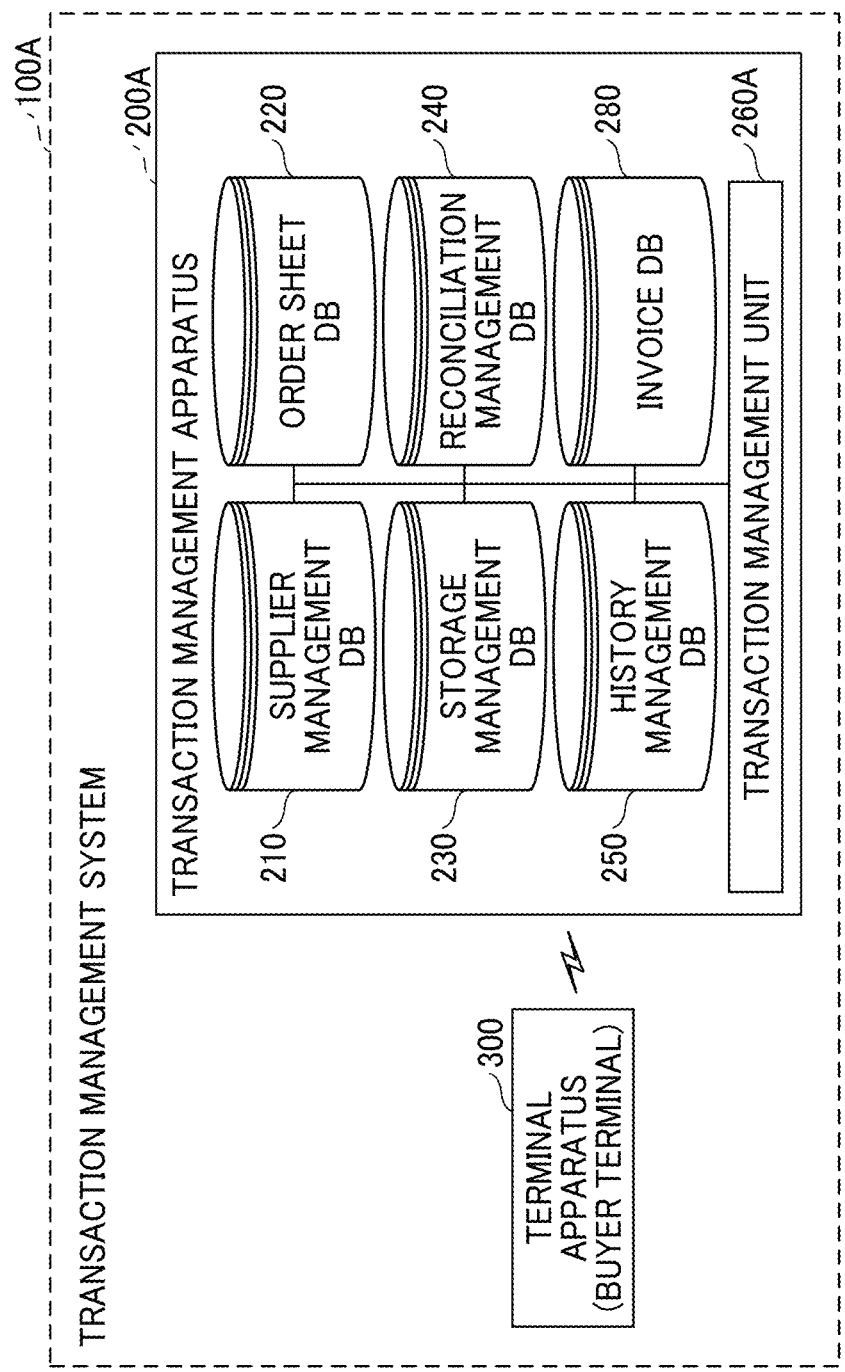

| TRANSMISSION TYPE: WEB PAGE | | |
|---|---|---|
| URL | ORDER SHEET NUMBER | INVOICE UPLOAD ID |
| https://xxxxx/yyyyy | 190185 | 1901850001 |
| https://xxxxxx/xxxxx | 190186 | 1901860001,1901860002 |

250-2

| INVOICE UPLOAD ID | INVOICE IMAGE | UPLOAD DATE AND TIME | REISSUANCE REQUEST NOTIFICATION |
|---|---|---|---|
| 1901850001 | 20180720130000123.pdf | 2018/07/20/ 13:00:00 | 2018/08/01 13:00:00 |
| 1901860001 | 20180720130001456.pdf | 2018/07/20/ 13:00:01 | 2018/08/01 15:00:00 |
| 1901860002 | 20180802090000789.pdf | 2018/08/02/ 09:00:00 | - |

FIG. 19

TENANT:User01(CORPORATION BB)

| ORDER SHEET NUMBER | INVOICE ID | PAYER | BILLING AMOUNT | INVOICE DATE | PAYMENT DUE DATE | DESCRIPTION INFORMATION ||||| ... | PAYEE ACCOUNT INFORMATION ||||| ... | 280 |
|---|---|---|---|---|---|---|---|---|---|---|---|---|---|---|---|---|---|---|
| | | | | | | ARTICLE CODE | ARTICLE NAME | QUANTITY | UNIT PRICE | PRICE | | BANK NAME | BRANCH NAME | ACCOUNT TYPE | ACCOUNT NUMBER | ACCOUNT HOLDER | ... | |
| 190186 | 20201023101234567 | CORPORATION AA | 1,790,208 | 2018/07/20 | 2018/08/20 | 10845 | RECEPTION TABLE | 2 | 59,800 | 119,600 | ... | CC BANK | ABC | CHECKING | 1111111 | CORP BB | ... | |

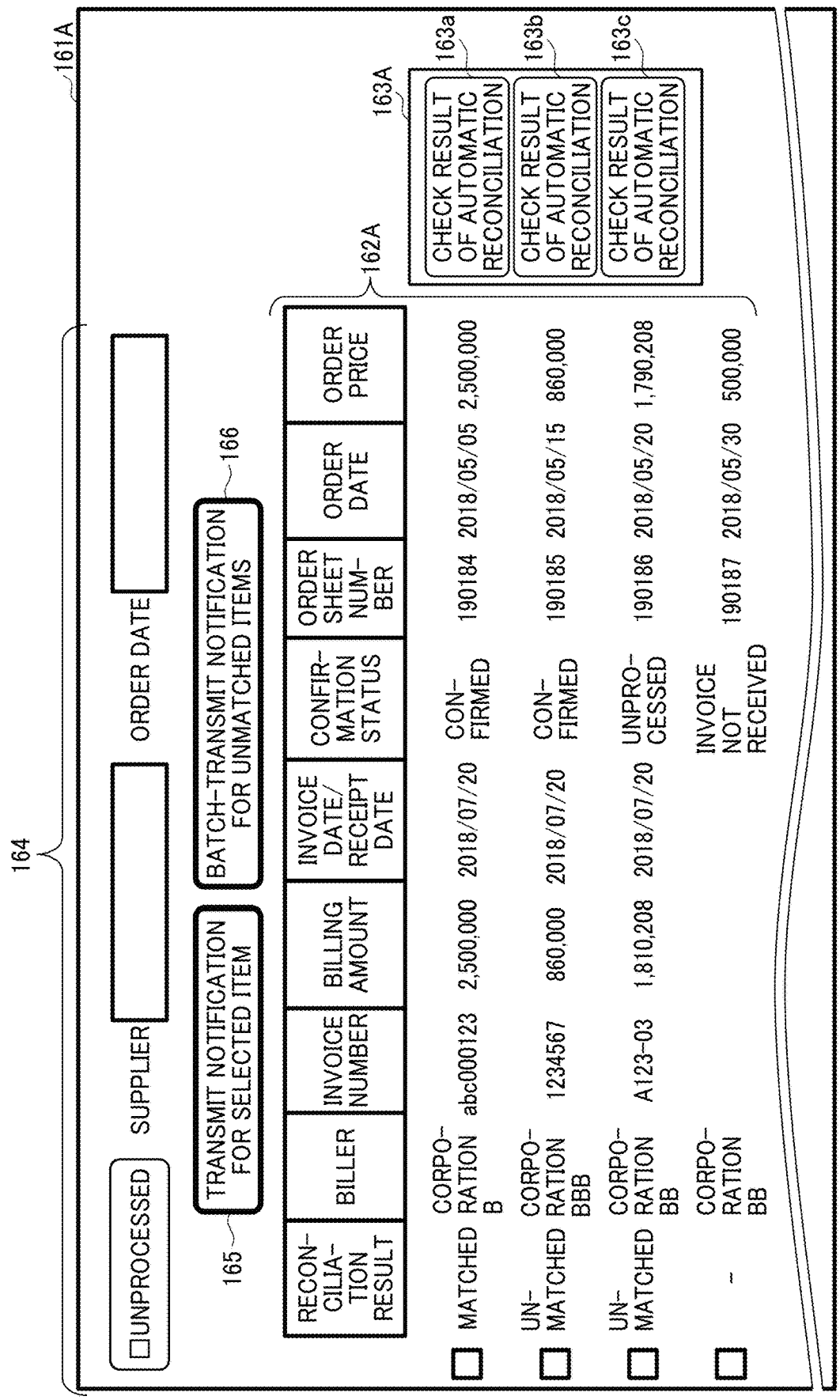

RECONCILIATION RESULT — 173c

| | ORDER INFORMATION | INVOICE INFORMATION |
|---|---|---|
| ☑ TOTAL AMOUNT | 1,790,208 | 1,810,208 |
| ☐ D1 ARTICLE CODE | 10845 | 10845 |
| ☐ D1 ARTICLE NAME | RECEPTION TABLE | RECEPTION TABLE |
| ☐ D1 QUANTITY | 2 | 2 |
| ☑ D1 UNIT PRICE | 59,800 | 69,800 |
| ☑ D1 PRICE | 119,600 | 139,600 |
| ...... | | |

173b

NOTES: The unit price ¥69,800 of the reception table is ¥10,000 higher than that in the order.

172A

INVOICE INFORMATION

PAYER  CORPORATION AA
BILLING AMOUNT  1,810,208
INVOICE DATE  2018/07/20
PAYMENT DUE DATE  2018/08/20

| ARTICLE CODE | ARTICLE NAME | QUAN-TITY | UNIT PRICE | PRICE |
|---|---|---|---|---|
| DESCRIP-TION D1  10845 | RECEP-TION TABLE | 2 | 69,800 | 139,600 |
| ...... | | | | |

PAYEE ACCOUNT A1

[CHECK FORM IMAGE] — 172d

122C

ORDER INFORMATION

ORDER SHEET NUMBER  190186
SUPPLIER  CORPORATION BB
ORDER PRICE  1,790,208
ORDER DATE  2018/05/20
SUGGESTED DELIVERY DATE  2018/06/30
DELIVERY ADDRESS  TOKYO, ...

| ARTICLE CODE | ARTICLE NAME | QUAN-TITY | UNIT PRICE | PRICE |
|---|---|---|---|---|
| DESCRIP-TION D1  10845 | RECEP-TION TABLE | 2 | 59,800 | 119,600 |
| ...... | | | | |

[CHECK FORM IMAGE] — 122d

[CONFIRM] — 175
[TEMPORARILY SAVE] — 174
[CANCEL]

RECONCILIATION RESULT 173c

| | ORDER INFORMATION | INVOICE INFORMATION |
|---|---|---|
| ☐ TOTAL AMOUNT | 1,790,208 | 1,790,208 |
| ☐ D1 ARTICLE NAME | RECEPTION TABLE | RECEPTION TABLE |
| ☐ D1 QUANTITY | 2 | 2 |
| ☐ D1 UNIT PRICE | 59,800 | 59,800 |
| ☐ D1 PRICE | 119,600 | 119,600 |
| ☐ D2 ARTICLE NAME | OFFICE DESK | OFFICE DESK |
| ...... | | |

NOTES _____ 173b

[REQUEST TO REISSUE INVOICE AND EXIT] 173e

[CANCEL]   [TEMPORARILY SAVE] 174   [CONFIRM] 175

---

172B

INVOICE INFORMATION

PAYER      CORPORATION AA
BILLING AMOUNT   1,790,208
INVOICE DATE   2018/08/02
PAYMENT DUE DATE   2018/08/20

| | ARTICLE CODE | ARTICLE NAME | QUAN-TITY | UNIT PRICE | PRICE |
|---|---|---|---|---|---|
| DESCRIP-TION D1 | 10845 | RECEPTION TABLE | 2 | 59,800 | 119,600 |
| ...... | | | | | |

PAYEE ACCOUNT A1

[CHECK FORM IMAGE] 172d

INVOICE HISTORY:2018/08/20/13:00:01 172e

---

122C

ORDER INFORMATION

ORDER SHEET NUMBER   190186
SUPPLIER   CORPORATION BB
ORDER PRICE   1,790,208
ORDER DATE   2018/05/20
SUGGESTED DELIVERY DATE   2018/06/30
DELIVERY ADDRESS   TOKYO, ...

| | ARTICLE CODE | ARTICLE NAME | QUAN-TITY | UNIT PRICE | PRICE |
|---|---|---|---|---|---|
| DESCRIP-TION D1 | 10845 | RECEPTION TABLE | 2 | 59,800 | 119,600 |
| ...... | | | | | |

[CHECK FORM IMAGE] 122d

INFORMATION PROCESSING APPARATUS, INFORMATION PROCESSING SYSTEM, AND INFORMATION PROCESSING METHOD

CROSS-REFERENCE TO RELATED APPLICATION

This patent application is based on and claims priority pursuant to 35 U.S.C. § 119(a) to Japanese Patent Application No. 2021-047776, filed on Mar. 22, 2021, in the Japan Patent Office, the entire disclosure of which is hereby incorporated by reference herein.

BACKGROUND

Technical Field

The present invention relates to an information processing apparatus, an information processing system, and an information processing method.

Description of the Related Art

There is an order management system that manages order transactions between a buyer apparatus and a supplier apparatus. For example, the order management system checks whether the content of an order placed by a buyer (i.e., the content of an order sheet) matches the content of an order received from a supplier (i.e., the content of an invoice).

SUMMARY

In one embodiment of this invention, there is provided an information processing apparatus that includes, for example, circuitry that generates transmission guide information according to a second form issued in response to a first form, and registers information representing the second form and first form information in a memory in association with each other. The information representing the second form is transmitted based on the transmission guide information. The first form information is included in first form image data.

In one embodiment of this invention, there is provided an information processing system that includes, for example, circuitry that generates transmission guide information according to a second form issued in response to a first form, and registers information representing the second form and first form information in a memory in association with each other. The information representing the second form is transmitted based on the transmission guide information. The first form information is included in first form image data. The circuitry further causes a display to display a screen including an input field for inputting the first form information and a selection field for selecting a method of transmitting second form image data.

In one embodiment of this invention, there is provided an information processing method that includes, for example, generating transmission guide information according to a second form issued in response to a first form, and registering information representing the second form and first form information in a memory in association with each other. The information representing the second form is transmitted based on the transmission guide information. The first form information is included in first form image data.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 4 is a diagram illustrating an example of a supplier management database of the first embodiment;

FIG. 5 is a diagram illustrating an example of an order sheet database of the first embodiment;

FIG. 6 is a diagram illustrating an example of a storage management database of the first embodiment;

FIG. 7 is a diagram illustrating another example of the storage management database of the first embodiment;

FIG. 8 is a diagram illustrating an example of a reconciliation management database of the first embodiment;

FIGS. 12A and 12B are diagrams illustrating the creation of an order sheet of the first embodiment;

FIGS. 13A and 13B are diagrams illustrating an example of the upload of an invoice of the first embodiment;

FIGS. 14A and 14B are diagrams illustrating another example of the upload of the invoice of the first embodiment;

FIG. 16 is a diagram illustrating an example of a reconciliation screen of the first embodiment;

FIG. 17 is a diagram illustrating an example of the system configuration of a transaction management system according to a second embodiment of the embodiment;

FIG. 18 is a diagram illustrating an example of a history management database of the second embodiment;

FIG. 19 is a diagram illustrating an example of an invoice database of the second embodiment;

FIG. 23 is a diagram illustrating an example of a list screen of the second embodiment;

FIG. 24 is a diagram illustrating an example of a reconciliation screen of the second embodiment;

FIG. 26 is a diagram illustrating another example of the reconciliation screen of the second embodiment.

Figure 1:
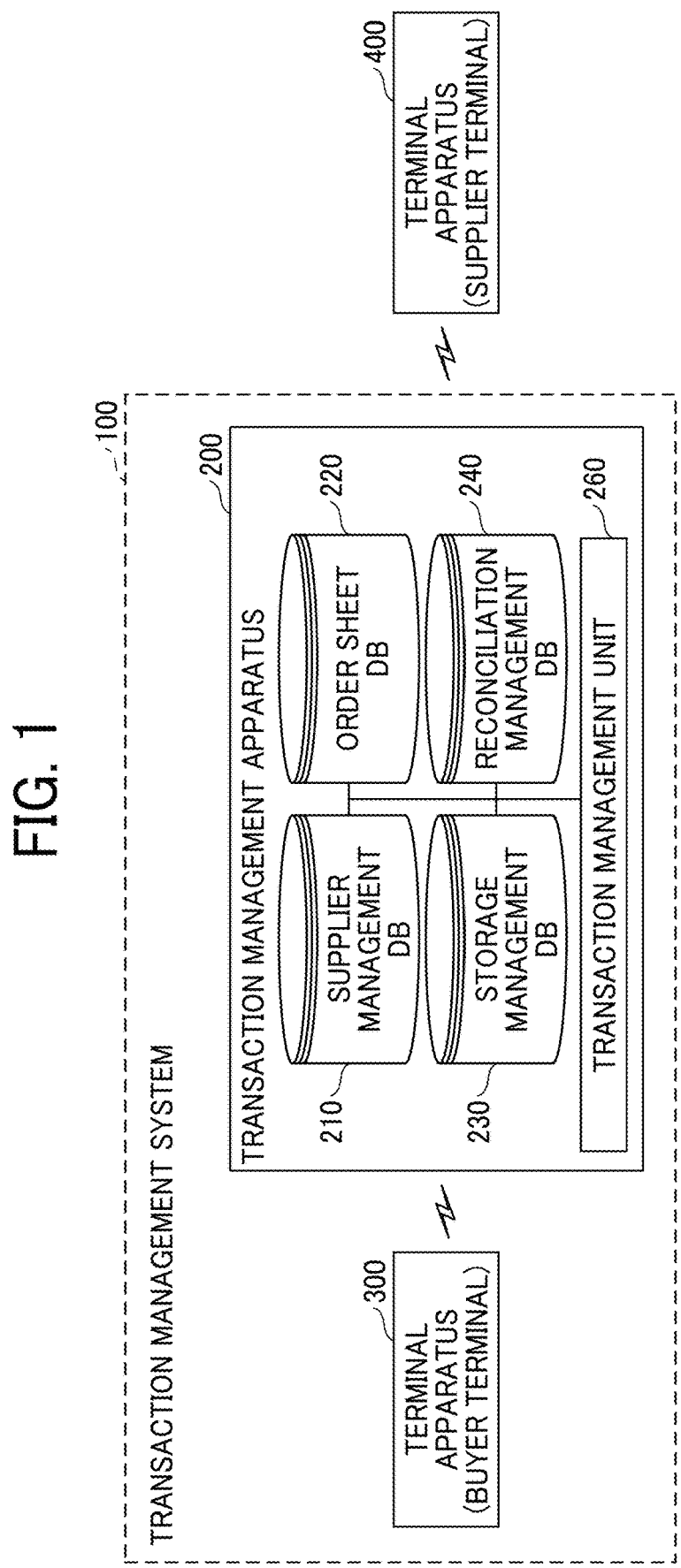
FIG. 1 is a diagram illustrating an example of the system configuration of a transaction management system according to a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A first embodiment of the present invention will be described below with reference to drawings.

FIG. 1 is a diagram illustrating an example of the system configuration of a transaction management system of the first embodiment.

A transaction management system 100 of the first embodiment includes a transaction management apparatus 200 and a terminal apparatus 300, which are communicable with each other via a network. The transaction management apparatus 200 of the first embodiment further communicates with a terminal apparatus 400 via a network. The transaction management system 100 is an example of an information processing system, and the transaction management apparatus 200 is an example of an information processing apparatus.

The transaction management apparatus 200 of the first embodiment creates form image data of a form based on form information input from the terminal apparatus 300. The transaction management apparatus 200 further acquires, from the terminal apparatus 400, form image data of a form issued in response to the form based on the form information input from the terminal apparatus 300. The transaction management apparatus 200 then manages the form image data created based on the form information input from the terminal apparatus 300 and the form image data acquired from the terminal apparatus 400 in association with each other.

In the following description, the form information input from the terminal apparatus 300 will be referred to as the first form information. Further, the form including the first form information will be referred to as the first form, and the form image data including the first form information will be referred to as the first form image data.

Further, in the following description, the form issued in response to the first form will be referred to as the second form, and the form image data representing the second form will be referred to as the second form image data. Further, the form information included in the second form will be referred to as the second form information.

When outputting the first form image data, the transaction management apparatus 200 of the first embodiment outputs transmission guide information for transmitting the second form image data from the terminal apparatus 400.

The transmission guide information of the first embodiment is generated in accordance with the second form, and is related to the transmission of the second form. The transmission guide information is transmitted to the sender of the second form. Specifically, the transmission guide information is generated in accordance with the method of transmitting the second form image data, for example. Examples of the transmission guide information include the address of a transmission screen used to transmit the second form and the information representing the transmission destination of the second form. Further, the transmission guide information, which is generated in accordance with the method of transmitting the second form image data, is associated with the storage location (i.e., the storage area) of the second form image data.

In response to receipt of the second form image data transmitted from the terminal apparatus 400 based on the transmission guide information, the transaction management apparatus 200 stores the received second form image data in a memory in association with the first form information.

In the first embodiment, therefore, the second form image data acquired from an external apparatus outside the transaction management system 100 is automatically associated with the generated first form information in the transaction management system 100.

In the first embodiment, the first form is an order sheet for ordering a commercial product, for example. In this case, the first form information is order sheet information representing the content of an order. When the first form is the order sheet, the second form corresponding to the first form is an invoice corresponding to the order sheet. In this case, the second form information is invoice information representing the content of the invoice, and the second form image data is invoice image data. Further, for example, the first form and the second form may be an order sheet and a statement of delivery, respectively, or may be a quotation and an order sheet, respectively.

It is assumed in the following description that the order sheet is an example of the first form, and that the invoice is an example of the second form.

The terminal apparatus 300 of the first embodiment is mainly used by an orderer who places orders via the transaction management apparatus 200. That is, the terminal apparatus 300 is used by a buyer who purchases commercial products, for example. In the following description, the terminal apparatus 300 may also be described as the buyer terminal 300.

In the first embodiment, the orderer is a business that places orders to various suppliers, for example. In the first embodiment, the business may be an individual or an organization such as a company or corporate. In the following description of the first embodiment, the business may also be described as the tenant.

The terminal apparatus 400 of the first embodiment is an external apparatus outside the transaction management system 100. The terminal apparatus 400 is mainly used by a seller of commercial products, for example. That is, the terminal apparatus 400 is used by a supplier who sells commercial products, for example. In the following description, the terminal apparatus 400 may also be described as the supplier terminal 400.

The transaction management apparatus 200 of the first embodiment includes a supplier management database (DB)

210, an order sheet DB 220, a storage management DB 230, a reconciliation management DB 240, and a transaction management unit 260.

The supplier management DB 210 stores supplier information related to suppliers, i.e., information related to sellers. The order sheet DB 220 stores order sheet information representing the content of orders input from the buyer terminal 300.

The storage management DB 230 stores identification information for identifying the order sheet information and the corresponding invoice image data in association with each other. The reconciliation management DB 240 stores information such as the information representing the result of reconciliation between the order sheet information and the invoice image data.

The transaction management unit 260 outputs the order sheet information input from the buyer terminal 300 and the transmission guide information for transmitting the invoice image data. Specifically, the transaction management unit 260 may transmit the order sheet information and the transmission guide information to the buyer terminal 300 or to the supplier terminal 400. Further, the transaction management unit 260 may output a printed material printed with the order sheet information and the transmission guide information.

In response to receipt of the invoice image data transmitted from the supplier terminal 400 based on the transmission guide information, the transaction management unit 260 stores the invoice image data and the order sheet information corresponding to the transmission guide information in the storage management DB 230 in association with each other.

With the above-described configuration, the first embodiment facilitates the association between the order sheet information and the invoice image data, i.e., the association between mutually related forms, thereby reducing the load of reconciliation work.

The reconciliation work is an operation of comparing the content of a placed order with the content of a received order corresponding to the placed order to check whether the content of the placed order matches the content of the received order.

In the example of FIG. 1, the supplier management DB 210, the order sheet DB 220, the storage management DB 230, and the reconciliation management DB 240 are included in the transaction management apparatus 200. However, the configuration of the databases is not limited to this example; part of all of the databases may be included in another apparatus.

Further, the transaction management apparatus 200 may be implemented by a plurality of information processing apparatuses.

A hardware configuration of the transaction management apparatus 200 of the first embodiment will be described.

Figure 2:
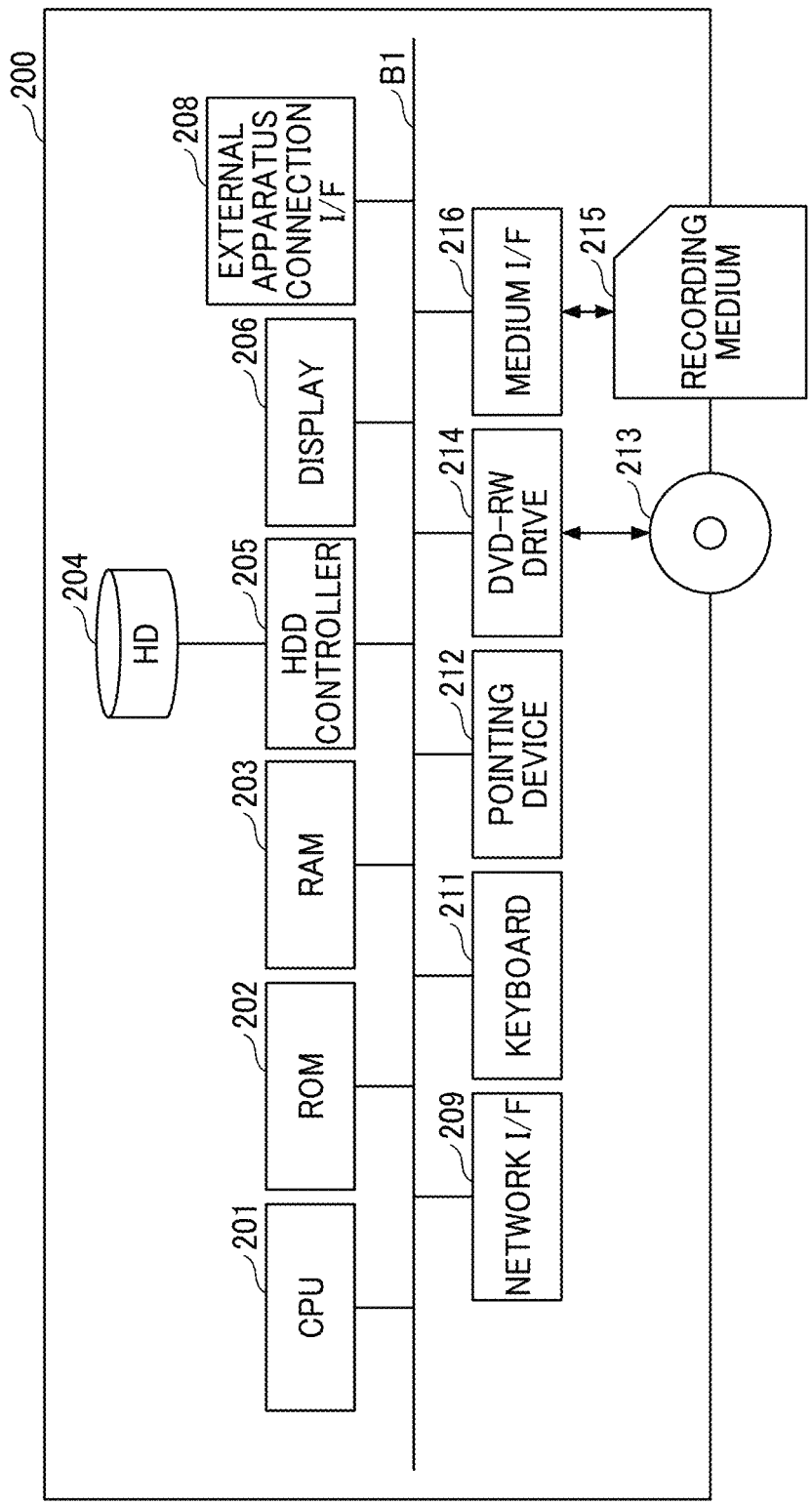
FIG. 2 is a diagram illustrating an example of the hardware configuration of a transaction management apparatus included in the transaction management system of the first embodiment.

FIG. 2 is a diagram illustrating an example of the hardware configuration of the transaction management apparatus 200. The transaction management apparatus 200 is implemented by a computer. As illustrated in FIG. 2, the transaction management apparatus 200 includes a central processing unit (CPU) 201, a read only memory (ROM) 202, a random access memory (RAM) 203, a hard disk (HD) 204, a hard disk drive (HDD) controller 205, a display 206, an external apparatus connection interface (I/F) 208, a network I/F 209, a bus line B1, a keyboard 211, a pointing device 212, a digital versatile disk-rewritable (DVD-RW) drive 214, and a medium I/F 216.

The CPU 201 controls the overall operation of the transaction management apparatus 200. The ROM 202 stores a program used to drive the CPU 201, such as an initial program loader (IPL). The RAM 203 is used as a work area for the CPU 201. The HD 204 stores various data of programs, for example. The HDD controller 205 controls writing and reading of various data to and from the HD 204 under the control of the CPU 201. The display 206 displays various information such as a cursor, menus, windows, text, and images. The external apparatus connection I/F 208 is an interface for connecting the transaction management apparatus 200 to various external apparatuses. The external apparatuses in this case include a universal serial bus (USB) memory and a printer, for example. The network I/F 209 is an interface for performing data communication via a communication network. The bus line B1 includes an address bus and a data bus for electrically connecting the CPU 201 and the other components in FIG. 2 to each other.

The keyboard 211 is an input device including a plurality of keys for inputting text, numerical values, and various instructions, for example. The pointing device 212 is an input device used to select and execute various instructions, select a processing target, and move the cursor, for example. The DVD-RW drive 214 controls writing and reading of various data to and from a DVD-RW 213 as an example of a removable recording medium. The removable recording medium is not limited to the DVD-RW, and may be a DVD-recordable (DVD-R), for example. The medium I/F 216 controls writing (i.e., storage) and reading of data to and from a recording medium 215 such as a flash memory.

A hardware configuration of the terminal apparatus (i.e., buyer terminal) 300 of the first embodiment will be described with reference to FIG. 3.

Figure 3:
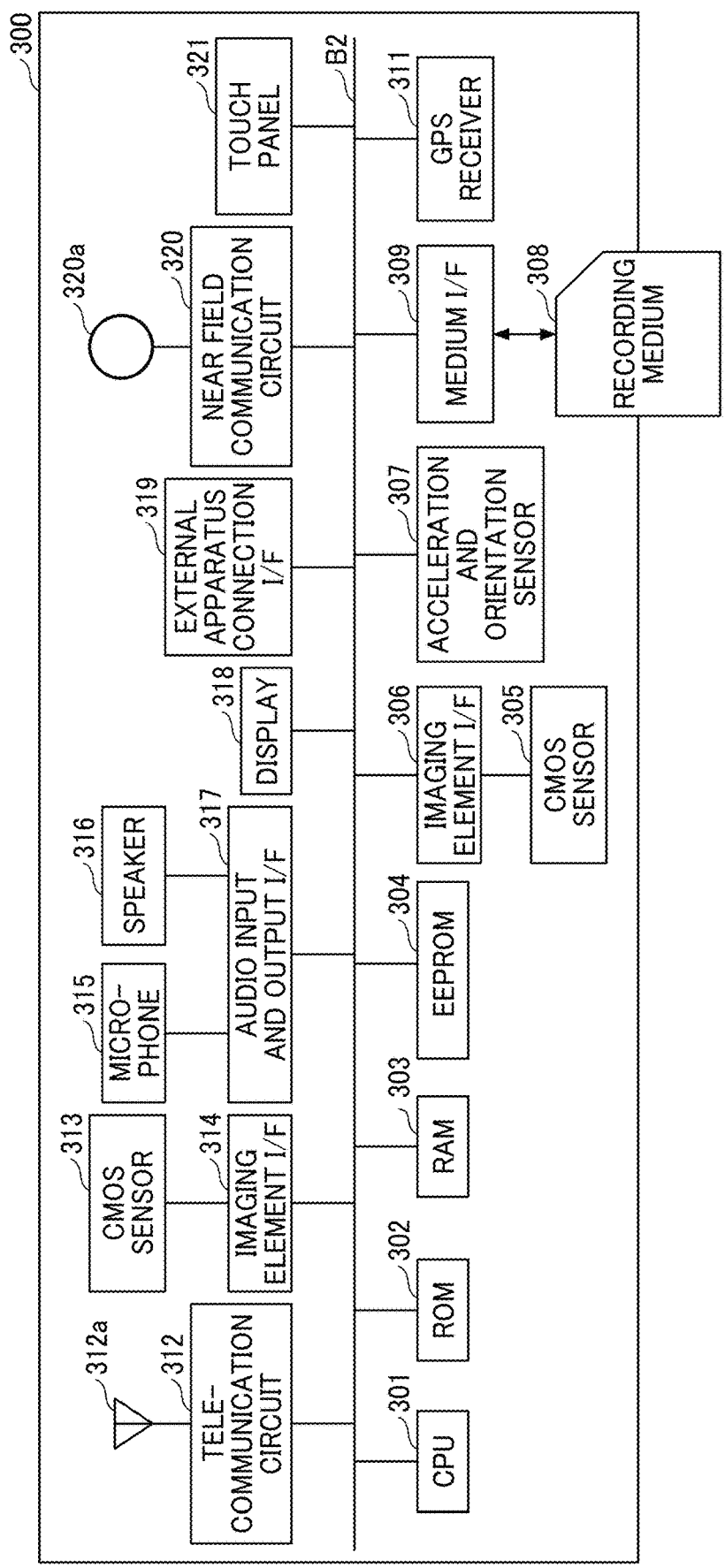
FIG. 3 is a diagram illustrating an example of the hardware configuration of a terminal apparatus included in the transaction management system of the first embodiment.

FIG. 3 is a diagram illustrating an example of the hardware configuration of the terminal apparatus 300. The terminal apparatus 300 of the first embodiment includes a CPU 301, a ROM 302, a RAM 303, an electrically erasable programmable read only memory (EEPROM) 304, a complementary metal oxide semiconductor (CMOS) sensor 305, an imaging element I/F 306, an acceleration and orientation sensor 307, a medium I/F 309, and a global positioning system (GPS) receiver 311.

The CPU 301 is an arithmetic processing device that controls the overall operation of the terminal apparatus 300. The ROM 302 stores programs for the CPU 301 and a program used to drive the CPU 301 such as an IPL. The RAM 303 is used as a work area for the CPU 301. The EEPROM 304 writes or reads various data of a program for the terminal apparatus, for example, under the control of the CPU 301. The ROM 302, the RAM 303, and the EEPROM 304 are examples of storage devices of the terminal apparatus 300.

The CMOS sensor 305 is a built-in imaging device that captures the image of a subject (mainly the image of a user) under the control of the CPU 301 to obtain image data. The CMOS sensor 305 may be replaced by another imaging device such as a charge coupled device (CCD) sensor.

The imaging element I/F 306 is a circuit that controls the driving of the CMOS sensor 305. The acceleration and orientation sensor 307 includes various types of sensors such as an electromagnetic compass that detects geomagnetism, a gyrocompass, and an acceleration sensor. The medium I/F 309 controls data writing (i.e., storage) and reading to and from a recording medium 308 such as a flash memory. The GPS receiver 311 receives a GPS signal from a GPS satellite.

The terminal apparatus 300 further includes a telecommunication circuit 312, an antenna 312a for the telecommunication circuit 312, a CMOS sensor 313, an imaging element I/F 314, a microphone 315, a speaker 316, an audio input and output I/F 317, a display (display device) 318, an external apparatus connection I/F 319, a near field communication circuit 320, an antenna 320a for the near field communication circuit 320, a touch panel 321, and a bus line B2.

The telecommunication circuit 312 is a circuit that communicates with another apparatus via a communication network. The CMOS sensor 313 is a built-in imaging device that captures the image of a subject under the control of the CPU 301 to obtain image data. The imaging element I/F 314 is a circuit that controls the driving of the CMOS sensor 313. The microphone 315 is a built-in circuit that converts sound into an electrical signal. The speaker 316 is a built-in circuit that converts an electrical signal into physical vibration to produce the sound of music or voice, for example. The audio input and output I/F 317 is a circuit that processes the input of an audio signal from the microphone 315 and the output of an audio signal to the speaker 316 under the control of the CPU 301.

The display 318 is a display device such as a liquid crystal or organic electroluminescence (EL) display, for example, which displays the image of the subject and various icons, for example. The external apparatus connection I/F 319 is an interface for connecting the terminal apparatus 300 to various external apparatuses. The near field communication circuit 320 is a communication circuit conforming to a standard such as near field communication (NFC) or Bluetooth (registered trademark). The touch panel 321 is an input device for the user to operate the terminal apparatus 300 by pressing the display 318. The display 318 is an example of a display included in the terminal apparatus 300. The bus line B2 includes an address bus and a data bus for electrically connecting the CPU 301 and the other components in FIG. 3 to each other.

The databases included in the transaction management apparatus 200 will be described with reference to FIGS. 4 to 8.

FIG. 4 is a diagram illustrating an example of the supplier management DB 210 of the first embodiment. The supplier management DB 210 of the first embodiment, which is provided for each tenant, for example, includes information items "name," "address," "phone number," "electronic mail address," and "name of contact person," for example, which are associated with a tenant identifier (ID) and a tenant name.

In the first embodiment, information including the values of items such as "name," "address," "phone number," "electronic mail address," and "name of contact person" in the supplier management DB 210 may be described as the supplier information. The tenant ID and the tenant name are information for identifying the tenant. The value of the item "name" represents the name of the supplier in a transaction. The respective values of the items "address," "phone number," "electronic mail address," and "name of contact person" represent the address, the phone number, and the electronic mail address of the supplier and the name of the contact person in charge of the transaction.

The information items included in the supplier information are not limited to those in the example illustrated in FIG. 4. The information items included in the supplier information may not include all items illustrated in FIG. 4, and may include an item other than those illustrated in FIG. 4.

The supplier information of the first embodiment is input to the transaction management apparatus 200 from the buyer terminal 300 and stored in the supplier management DB 210.

FIG. 5 is a diagram illustrating an example of the order sheet DB 220 of the first embodiment. Similarly to the supplier management DB 210, the order sheet DB 220 of the first embodiment may be provided for each tenant.

The order sheet DB 220 includes information items "order sheet number," "reconciliation result," "confirmation status," "supplier," "order price," "order date," "suggested delivery date," "delivery address," "form image path," and "description information," for example, which are associated with the tenant ID and the tenant name.

In the order sheet DB 220, the item "order sheet number" is associated with the other items. In the first embodiment, information including the value of the item "order sheet number" and the values of the other items in the order sheet DB 220 will be described as the order sheet information.

In the first embodiment, when the values of information items included in an order sheet image are input from the terminal apparatus 400, the order sheet number is generated, and the order sheet information including the order sheet number is stored in the order sheet DB 220. Alternatively, the values of information items in the order sheet image may be the values input from the buyer terminal 300. The information items included in the order sheet image are "supplier," "order price," "order date," "suggested delivery date," "delivery address," and "description information," for example.

The value of the item "order sheet number" is form identification information for identifying the form (i.e., the order sheet). That is, the value of the item "order sheet number" is identification information for identifying the first form information.

The value of the item "reconciliation result" represents the result of the reconciliation work performed by the tenant to reconcile the order sheet information with the invoice image data. Specifically, the item "reconciliation result" with a value "matched" indicates that the content of the order matches the content of the invoice, and the item "reconciliation result" with a value "unmatched" indicates that the content of the order does not match the content of the invoice.

The value of the item "confirmation status" represents the progress of the reconciliation work on the corresponding order sheet information. Specifically, for example, the item "confirmation status" with a value "confirmed" indicates that the reconciliation work with visual inspection by the buyer has been completed. Further, for example, the item "confirmation status" with a value "unprocessed" indicates that the reconciliation work with the visual inspection by the buyer has not been performed. The item "confirmation status" with a value "invoice not received" indicates that the invoice image data corresponding to the order sheet information has not been received. When the invoice image data corresponding to the order sheet information has not been received, the invoice image data and the order sheet number have not been associated with each other in the storage management DB 230.

The items "reconciliation result" and "confirmation status" may be included in the information items of the reconciliation management DB 240, which will be described later.

The value of the item "supplier" represents the name of the supplier described in the order sheet identified with the order sheet number. The respective values of the items "order price," "order date," and "suggested delivery date" represent the order price, the order date, and the suggested delivery date described in the order sheet.

The value of the item "delivery address" represents the address to which the ordered commercial product is to be delivered. The value of the item "form image path" represents the storage location of the order sheet image data.

The item "description information" is associated with items representing the breakdown of the order price, such as items "article code," "article name," and "quantity." The values of the item "description information" represent the breakdown of the order price.

The information items included in the order sheet information are not limited to those in the example illustrated in FIG. 5. The information items included in the order sheet information may not include all items illustrated in FIG. 5, and may include an item other than those illustrated in FIG. 5.

FIG. 6 is a diagram illustrating an example of the storage management DB 230 of the first embodiment. In the example of the storage management DB 230 illustrated in FIG. 6, the storage location of the invoice image data represented by the transmission guide information is represented by the uniform resource locator (URL).

The storage management DB 230 of the first embodiment includes information items "URL," "order sheet number," and "invoice image." The item "order sheet number" is associated with the other items.

The value of the item "URL" represents the storage location of the corresponding invoice image data. That is, the value of the item "URL" is the transmission guide information specifying the storage location of the invoice image data (i.e., the second form image data). The value of the item "invoice image" represents the invoice image data.

The example of FIG. 6 indicates that the storage location of the invoice image data corresponding to an order sheet number "1901985" is specified as "https://xxxxxx/yyyyyy."

In the example of FIG. 6, therefore, when the transaction management apparatus 200 receives the invoice image data corresponding to the order sheet number "1901985" from the supplier terminal 400, the transaction management apparatus 200 stores the received invoice image data in the storage area associated with https://xxxxxx/yyyyyy. That is, the transmission guide information of the first embodiment is understood as information for specifying the storage area in which the second form image data is to be stored.

In the above-described example of FIG. 6, the transmission guide information is represented by the URL. The transmission guide information, however, is not necessarily required to be represented by the URL, and may be represented by the electronic mail address, for example.

A description will be given of another example of the storage management DB 230, in which the transmission guide information is represented by the electronic mail address.

FIG. 7 is a diagram illustrating another example of the storage management DB 230 of the first embodiment. A storage management DB 230A illustrated in FIG. 7 includes information items "electronic mail address," "order sheet number," and "invoice image."

In the storage management DB 230A, the value of the item "electronic mail address" represents the storage location of the corresponding invoice image data. That is, the value of the item "electronic mail address" is the transmission guide information for transmitting the invoice image data (i.e., the second form image data).

FIG. 8 is a diagram illustrating an example of the reconciliation management DB 240 of the first embodiment. The reconciliation management DB 240 of the first embodiment may be provided for each tenant.

The reconciliation management DB 240 includes information items "order sheet number," "process date and time," "total amount," and "description information," for example. The item "order sheet number" is associated with the other items.

The value of the item "process date and time" represents the date and time of execution of the reconciliation work. The value of the item "total amount" represents the order price included in the order sheet information, for example.

The information items included in the reconciliation management DB 240 are not limited to those in the example illustrated in FIG. 8. The information items included in the reconciliation management DB 240 may not include all items illustrated in FIG. 8, and may include an item other than those illustrated in FIG. 8.

Functions of the apparatuses included in the transaction management system 100 of the first embodiment will be described with reference to FIG. 9.

Figure 9:
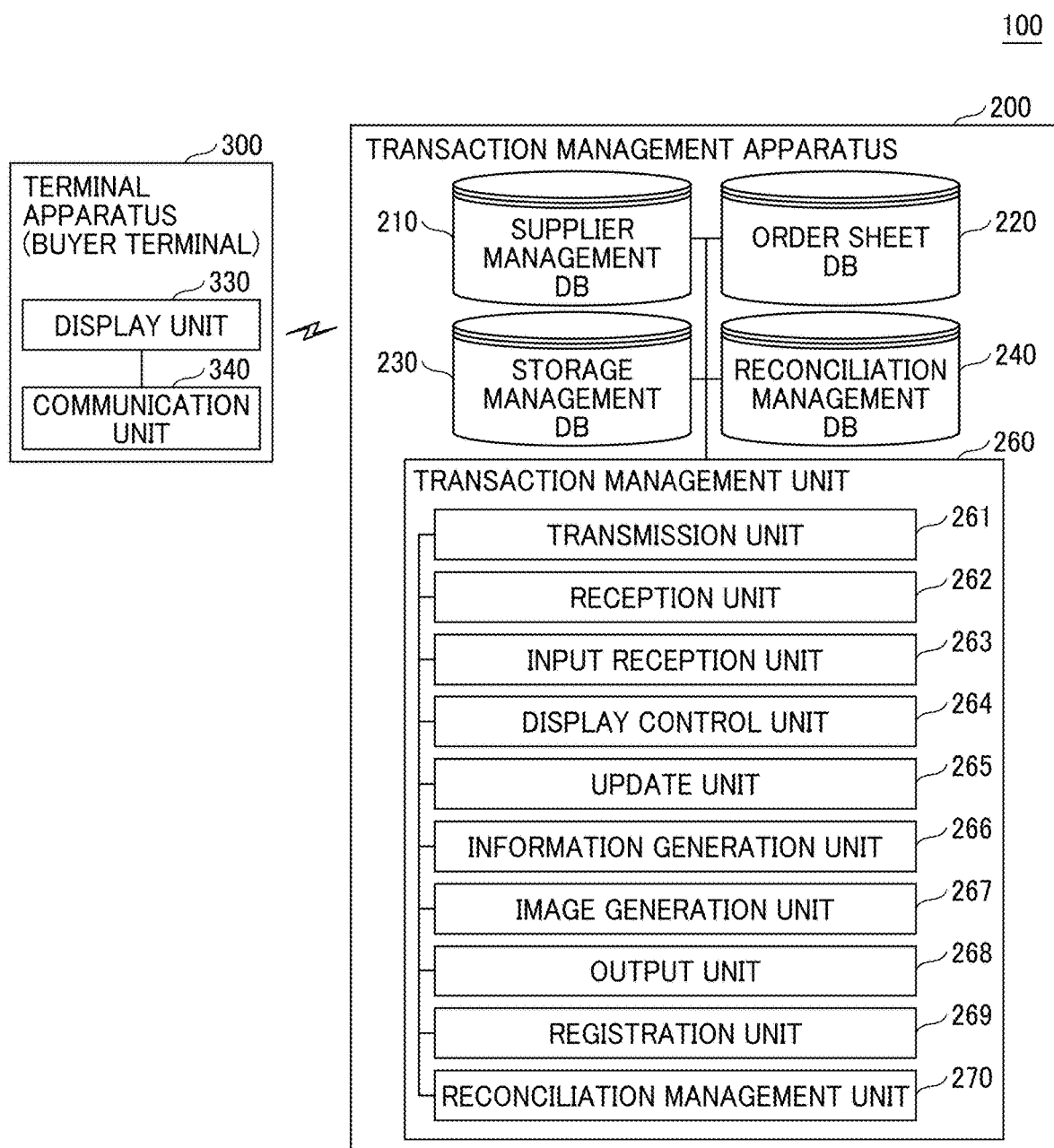
FIG. 9 is a diagram illustrating functions of the apparatuses included in the transaction management system of the first embodiment.

FIG. 9 is a diagram illustrating functions of the apparatuses included in the transaction management system 100 of the first embodiment.

Functions of the transaction management apparatus 200 will first be described.

The transaction management unit 260 in the transaction management apparatus 200 of the first embodiment includes a transmission unit 261, a reception unit 262, an input reception unit 263, a display control unit 264, an update unit 265, an information generation unit 266, an image generation unit 267, an output unit 268, a registration unit 269, and a reconciliation management unit 270.

The transmission unit 261 transmits information to another apparatus from the transaction management apparatus 200. The reception unit 262 receives information transmitted to the transaction management apparatus 200 from another apparatus. The input reception unit 263 receives various inputs to the transaction management apparatus 200. Specifically, the input reception unit 263 receives input of various information and requests from the buyer terminal 300.

The display control unit 264 controls the display on the buyer terminal 300. The display control unit 264 may further control the display on the supplier terminal 400. The update unit 265 updates the above-described databases in accordance with the process of the transaction management unit 260.

The information generation unit 266 generates the order sheet number to be assigned to the order sheet. The information generation unit 266 further generates the transmission guide information in accordance with the operation performed on the buyer terminal 300. The transmission guide information may be represented by the URL or electronic mail address, for example. In the first embodiment, the transmission guide information is generated by the information generation unit 266 included in the transaction management apparatus 200. However, the transmission guide information is not necessarily generated by the information generation unit 266. For example, a process of generating the URL or electronic mail address representing the transmission guide information may be executed by an external apparatus outside the transaction management system 100. In this case, the transaction management apparatus 200 may cooperate with the external apparatus to acquire the URL or electronic mail address generated by the external apparatus as the transmission guide information.

The image generation unit 267 generates the order sheet image data (i.e., the first form image data). The image generation unit 267 may further generate, for example, a two-dimensional code containing the transmission guide information generated by the information generation unit 266, and may include the generated two-dimensional code in the order sheet image data.

The output unit 268 outputs the order sheet image data and the transmission guide information. Specifically, the output unit 268 may transmit the order sheet image data and the transmission guide information to the supplier terminal 400, or may transmit to an image forming apparatus, for example, an order sheet print instruction including the order sheet image data with the transmission guide information. That is, the output unit 268 of the first embodiment outputs the first form image data and the transmission guide information for transmitting the second form image data.

The output unit 268 may not directly transmit the order sheet image data and the transmission guide information to the supplier terminal 400. For example, the output unit 268 may transmit an electronic mail including the order sheet image data and the transmission guide information to the electronic mail address of the supplier so that the supplier terminal 400 receives the electronic mail from an electronic mail server to thereby receive the order sheet image data and the transmission guide information. When transmitting the transmission guide information to the supplier terminal 400, the output unit 268 may not transmit the order sheet image data. In this case, the output unit 268 may transmit the order sheet image data to the supplier terminal 400 separately from the transmission guide information. Further, the output unit 268 may transmit the order sheet information and order sheet identification information to the supplier terminal 400 together with the transmission guide information.

The registration unit 269 stores the order sheet number and the invoice image data transmitted from the supplier terminal 400 in the storage management DB 230 in association with each other. That is, the registration unit 269 stores the second form image data transmitted based on the transmission guide information and the first form information in a memory (i.e., the storage management DB 230) in association with each other.

The reconciliation management unit 270 performs various processes for executing the reconciliation work. Specifically, with the display control unit 264 causing the buyer terminal 300 to display a reconciliation screen for performing the reconciliation work, the reconciliation management unit 270 acquires various information according to the result of the reconciliation work.

Functions of the buyer terminal 300 will be described.

The buyer terminal 300 of the first embodiment includes a display unit 330 and a communication unit 340. The display unit 330 causes the display 318 of the buyer terminal 300 to display information. The communication unit 340 performs the transmission and reception of information between the buyer terminal 300 and another apparatus.

Operations of the transaction management system 100 of the first embodiment will be described with reference to FIGS. 10 and 11.

Figure 10:
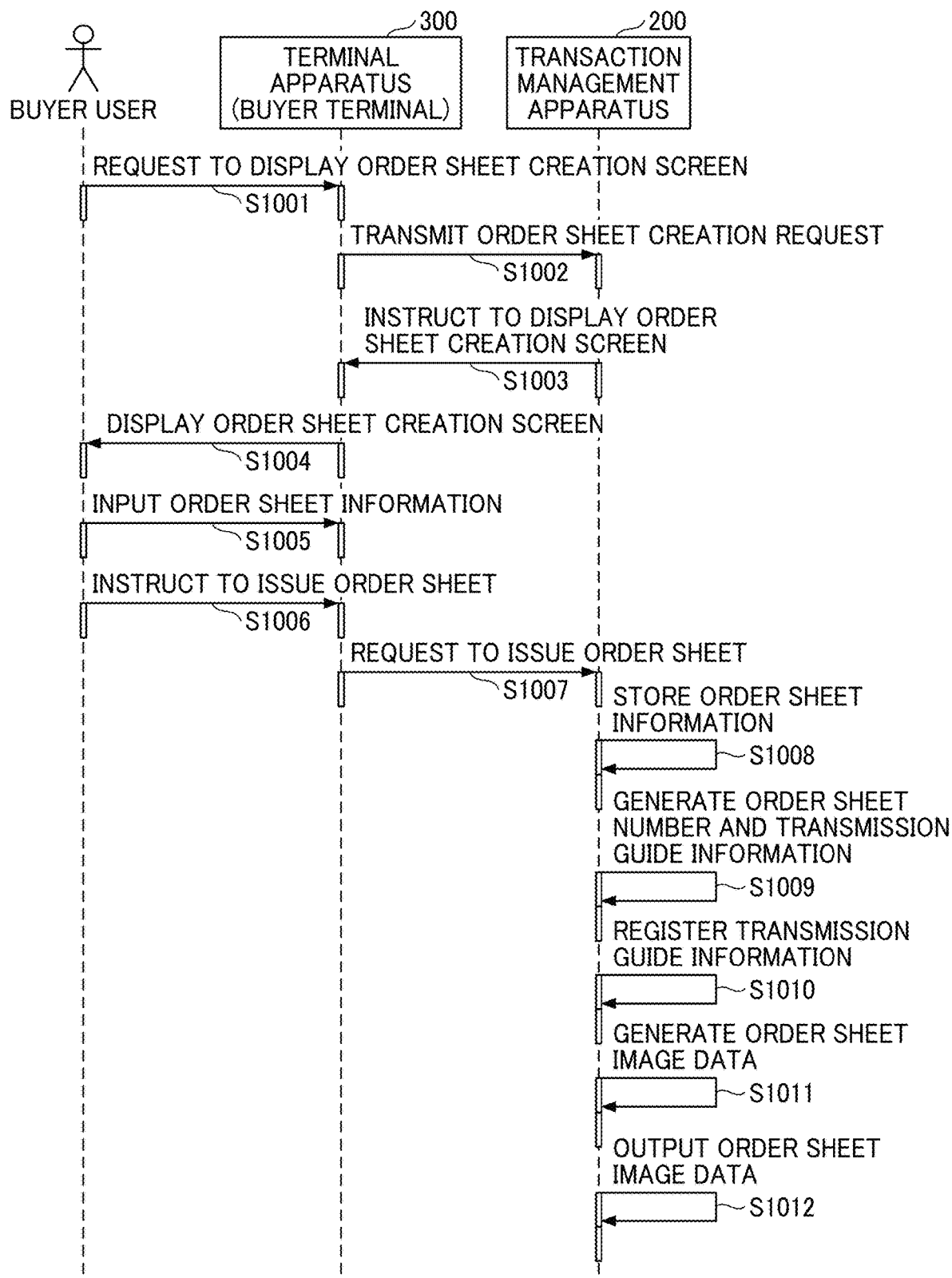
FIG. 10 is a sequence diagram illustrating an operation of the transaction management system of the first embodiment.

FIG. 10 is a sequence diagram illustrating an operation of the transaction management system 100 of the first embodiment. FIG. 10 illustrates an operation of the transaction management system 100 up to the issuance of the order sheet.

In the transaction management system 100 of the first embodiment, the buyer terminal 300 receives a request to display an order sheet creation screen in accordance with an operation performed by a tenant using the buyer terminal 300 (step S1001). The buyer terminal 300 then transmits an order sheet creation request to the transaction management apparatus 200 (step S1002). In FIG. 10, a user of the tenant using the buyer terminal 300 is illustrated as a buyer user.

In the transaction management apparatus 200, the input reception unit 263 receives the order sheet creation request, and the display control unit 264 transmits a display instruction to the buyer terminal 300 to instruct to display the order sheet creation screen (step S1003). In the buyer terminal 300, in response to receipt of the display instruction to display the order sheet creation screen, the display unit 330 causes the display 318 to display the order sheet creation screen (step S1004). The storage location of the invoice image data is specified on the order sheet creation screen. Details of the order sheet creation screen will be described later.

The buyer terminal 300 then receives input of the order sheet information (step S1005), and receives input of an order sheet issuance instruction from the tenant (i.e., the buyer user) (step S1006).

In response to receipt of the order sheet issuance instruction, the buyer terminal 300 transmits to the transaction management apparatus 200 the input order sheet information and a request to issue an order sheet including the order sheet information (step S1007). The request to issue the order sheet may include information for identifying the tenant using the buyer terminal 300. The information for identifying the tenant is the tenant ID or the tenant name, for example.

In the transaction management apparatus 200, the input reception unit 263 receives the request to issue the order sheet and the order sheet information, and the update unit 265 stores the order sheet information in the order sheet DB 220 (step S1008).

Then, in the transaction management apparatus 200, the information generation unit 266 generates the order sheet number and includes the generated order sheet number in the order sheet information stored in the order sheet DB 220 at step S1008 (step S1009).

In this process, the information generation unit 266 generates the transmission guide information based on the method of transmitting the invoice image data specified on the order sheet creation screen.

Then, in the transaction management apparatus 200, the update unit 265 stores the transmission guide information in the storage management DB 230 in association with the order sheet number (step S1010).

In the transaction management apparatus 200, the image generation unit 267 then generates the order sheet image data (step S1011). In this process, the transaction management apparatus 200 may generate a two-dimensional code representing the transmission guide information stored in the storage management DB 230 at step S1010, and may include the generated two-dimensional code in the order sheet image data.

Then, in the transaction management apparatus 200, the output unit 268 outputs the order sheet image data and the transmission guide information (step S1012).

Figure 11:
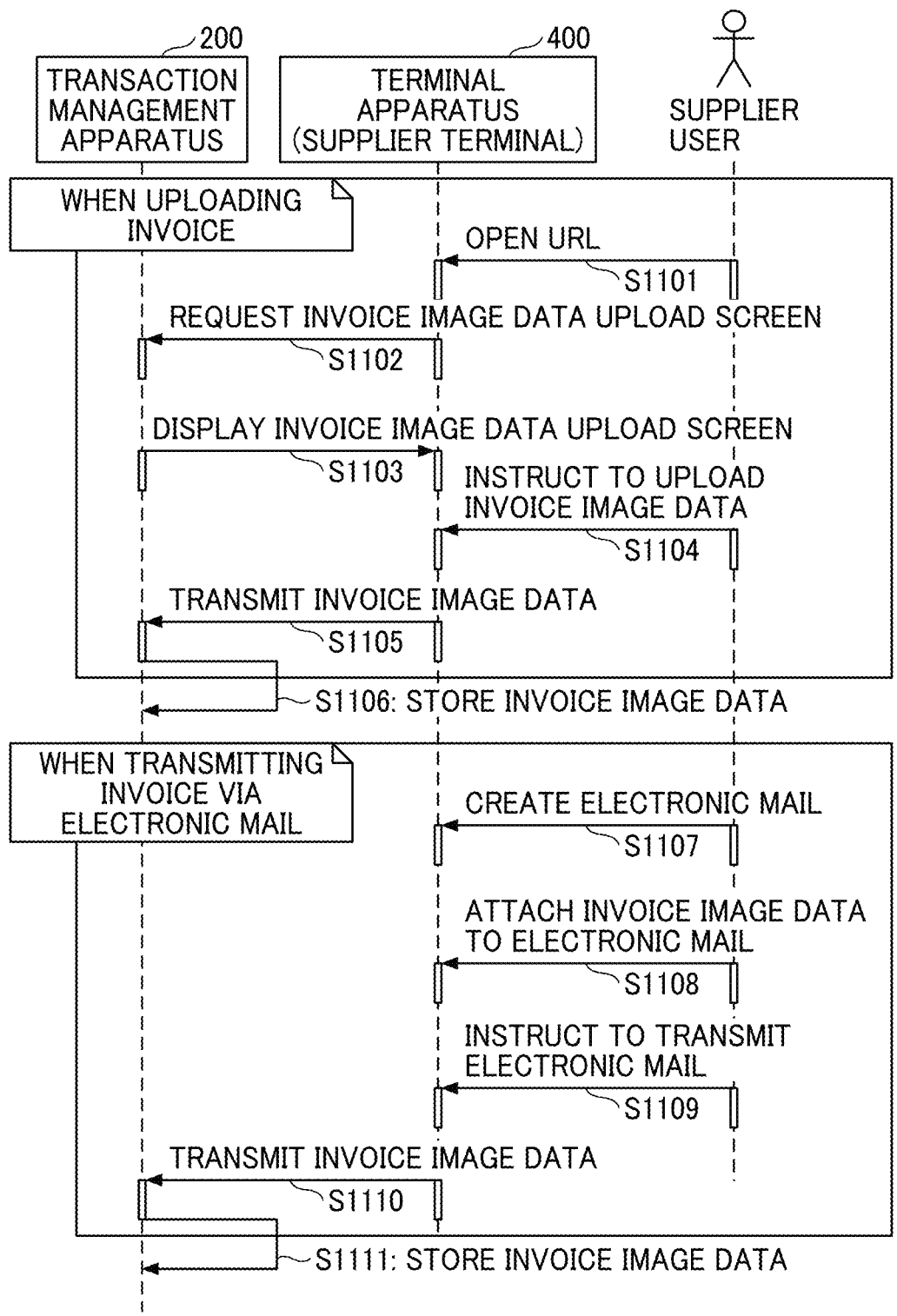
FIG. 11 is a sequence diagram illustrating another operation of the transaction management system of the first embodiment.

With reference to FIG. 11, a description will be given of another operation of the transaction management system 100 to transmit the invoice image data to the transaction management apparatus 200 from the supplier terminal 400.

FIG. 11 is a sequence diagram illustrating another operation of the transaction management system 100 of the first embodiment.

The processes of steps S1101 to S1106 in FIG. 11 are performed when the transmission guide information is represented by the URL. The processes of steps S1107 to S1111 in FIG. 11 are performed when the transmission guide information is represented by the electronic mail address. In FIG. 11, a user of a tenant using the supplier terminal 400 is illustrated as a supplier user.

In the first embodiment, the supplier terminal 400 receives a user operation of opening the URL representing the transmission guide information (step S1101), and transmits a display request to the transaction management apparatus 200 to request to display an invoice image data upload screen (step S1102).

In response to receipt of the display request, the transaction management apparatus 200 causes the supplier terminal 400 to display the invoice image data upload screen (step S1103). Details of the invoice image data upload screen will be described later.

Then, the supplier terminal 400 receives a user operation of instructing to upload the invoice image data (step S1104), and transmits the invoice image data to the transaction management apparatus 200 (step S1105). In this process, the invoice image data may be transmitted to the transaction management apparatus 200 in association with the URL representing the transmission guide information.

After the invoice image data is transmitted to the URL representing the transmission guide information, the registration unit 269 of the transaction management apparatus 200 stores the transmitted invoice image data in the storage management DB 230 in association with the transmission guide information (i.e., the URL) and the order sheet number (step S1106). In the first embodiment, the storage location of the invoice image data associated with the URL representing the transmission guide information is set to the storage management DB 230.

A description will be given of an operation of the transaction management system 100 performed when the transmission guide information is represented by the electronic mail address.

In the first embodiment, the supplier terminal 400 receives a user operation of creating an electronic mail addressed to the electronic mail address representing the transmission guide information (step S1107), and receives a user operation of attaching the invoice image data to the electronic mail (step S1108).

The supplier terminal 400 then receives a user operation of instructing to transmit the electronic mail attached with the invoice image data (step S1109), and transmits the invoice image data to the electronic mail address (step S1110).

Then, in the transaction management apparatus 200, the registration unit 269 stores the invoice image data attached to the electronic mail in the storage management DB 230 in association with the transmission guide information (i.e., the electronic mail address) and the order sheet number (step S1111). In the first embodiment, the storage location of the invoice image data associated with the electronic mail address representing the transmission guide information is set to the storage management DB 230.

In the first embodiment, the invoice image data is thus uploaded to the transaction management apparatus 200. In the first embodiment, uploading the invoice image data to the transaction management apparatus 200 means transmitting the invoice image data to the transaction management apparatus 200 from the supplier terminal 400.

With reference to FIGS. 12A and 12B, a description will be given of an example of the order sheet creation screen and an example of the order sheet image data of the first embodiment.

FIGS. 12A and 12B are diagrams illustrating the creation of the order sheet. FIG. 12A illustrates an example of the order sheet creation screen. FIG. 12B illustrates an example of the order sheet image data.

A screen 121 illustrated in FIG. 12A is an example of the order sheet creation screen displayed on the buyer terminal 300 at step S1004 in FIG. 10. The screen 121 includes display areas 122, 123, and 124 and an operation button 125.

The display area 122 displays an input field for inputting the order sheet information (i.e., an input field for inputting the first form information). The input field in the display area 122 is used to input the values of the items included in the order sheet information.

The display area 123 displays a selection field for selecting the method of transmitting the order sheet to the supplier from the buyer. Specifically, the display area 123 displays options for the order sheet transmission method: the transmission by "electronic mail" and the transmission by "postal mail." The display area 123 further displays an input field 123a for inputting the electronic mail address when the electronic mail is selected as the order sheet transmission method.

The display area 124 displays a selection field for selecting the method of transmitting the invoice to the buyer from the supplier (i.e., a selection field for selecting the method of transmitting the second form image data). Specifically, the display area 124 displays options for the invoice transmission method: the transmission by "world wide web (web)" and the transmission by "electronic mail."

In the first embodiment, the method of transmitting the invoice image data represented by the option "web" transmits the invoice image data to be stored in the storage location corresponding to a particular URL. The method of transmitting the invoice image data represented by the option "electronic mail" transmits the invoice image data to be stored in the storage location corresponding to a particular electronic mail address.

In the transaction management apparatus 200 of the first embodiment, in response to the selection of the option "web," for example, the information generation unit 266 generates the URL representing the transmission guide information. Further, in response to the selection of the option "electronic mail," for example, the information generation unit 266 of the transaction management apparatus 200 generates the electronic mail address representing the transmission guide information. The URL or electronic mail address representing transmission guide information may be input to the buyer terminal 300.

Further, an invoice transmission method previously registered in association with the supplier may be displayed in a display area as the default value of the selected option. Alternatively, the invoice transmission method previously registered in association with the supplier may be fixed as the invoice transmission method for the supplier, thereby making it unnecessary to display the display area 124 on the screen 121.

The operation button 125 is used to transmit an order sheet issuance request to the transaction management apparatus 200 from the buyer terminal 300.

When the operation button 125 is operated after the values of the items included in the order sheet information are input and the order sheet transmission method and the invoice transmission method are selected, the buyer terminal 300 of the first embodiment transmits the order sheet issuance request to the transaction management apparatus 200.

An order sheet image 126 illustrated in FIG. 12B is an example of the order sheet image represented by the order sheet image data generated at step S1011 in FIG. 10.

The order sheet image 126 includes order sheet information 122A, an order sheet number 127, and a two-dimensional code 129.

The order sheet information 122A corresponds to the order sheet information input in the display area 122. The order sheet number 127 corresponds to the order sheet number generated by the information generation unit 266 at step S1009 in FIG. 10. The two-dimensional code 129 corresponds to the two-dimensional code generated at step S1011 in FIG. 10. The two-dimensional code 129 includes the transmission guide information representing the storage location of the invoice image data specified on the screen 121.

The example of FIG. 12B illustrates a quick response (QR) code (registered trademark) as an example of the two-dimensional code. The two-dimensional code, however, is not limited to the QR code. Further, in the example of FIG. 12B, the transmission guide information is included in the order sheet image 126 in the form of the two-dimensional code. The transmission guide information, however, is not necessarily included in the order sheet image data in the form of the two-dimensional code, and may be included in the order sheet image data in a form other than the two-dimensional code. Further, the transmission guide information may not be included in the order sheet image data.

In the first embodiment, if the option "electronic mail" is selected in the display area 123 on the screen 121, the order sheet image data representing the order sheet image 126 is transmitted to the electronic mail address input in the input field 123a.

Further, in the first embodiment, if the option "postal mail" is selected in the display area 123 on the screen 121, the order sheet image 126 is printed with an image forming apparatus, for example, and sent to the supplier by postal mail.

As described above, the transaction management apparatus 200 of the first embodiment outputs the order sheet image data representing the order sheet generated based on the input order sheet information and the transmission guide information generated in accordance with the method of transmitting the invoice image data.

Then, in response to receipt of the invoice image data based on the transmission guide information, the transaction management apparatus 200 of the first embodiment stores the invoice image data in the storage management DB 230 in association with the transmission guide information and the order sheet number.

The upload of the invoice by the supplier will be described with reference to FIGS. 13A and 13B.

FIGS. 13A and 13B are diagrams illustrating an example of the upload of the invoice. A screen 131 illustrated in FIG. 13A is an example of a screen displaying a cover letter that is transmitted together with the order sheet image data. A screen 135 illustrated in FIG. 13B is an example of a screen for performing an operation of uploading the invoice.

The screen 131 illustrated in FIG. 13A may be displayed on the supplier terminal 400 together with the order sheet image 126 illustrated in FIG. 12B, for example.

The screen 131 includes display areas 126A, 132, and 133. The display area 126A displays the file name of the order sheet image data representing the order sheet image 126. The display area 132 displays information related to the transmission of the order sheet. The display area 133 displays the transmission guide information representing the storage location of the invoice image data. The screen 131 displays the transmission guide information for the case in which the option "web" is selected as the invoice transmission method on the screen 121.

In response to receipt of a user operation of selecting the transmission guide information displayed in the display area 133 on the screen 131, the supplier terminal 400 transitions to the screen 135 from the screen 131.

In the first embodiment, with the operation of selecting the transmission guide information displayed in the display area 133 on the screen 131, the storage location of the invoice image data selected through the operation performed on the screen 135 is specified as the storage location represented by the transmission guide information.

The screen 135 is an example of a screen for performing an operation of transmitting the invoice image data to the storage location represented by the transmission guide information displayed in the display area 133. The screen 135 is displayed on the supplier terminal 400.

The screen 135 includes a display area 134 displaying the order sheet information 122A, an operation button 136, a display area 137, and an operation button 138. When the operation button 136 is operated on the screen 135, the display area 137 displays a list of invoice image data items to be uploaded.

When the operation button 138 is operated after the selection of the invoice image data item to be uploaded from the list of invoice image data items displayed in the display area 137, for example, the supplier terminal 400 transmits the selected invoice image data item to the transaction management apparatus 200.

In this process, the invoice image data is transmitted to the transaction management apparatus 200 from the supplier terminal 400 in association with the transmission guide information.

FIGS. 14A and 14B are diagrams illustrating another example of the upload of the invoice. A screen 131A illustrated in FIG. 14A is an example of the screen displaying the cover letter that is transmitted together with the order sheet image data. A screen 131B illustrated in FIG. 14B is another example of the screen displaying the cover letter that is transmitted together with the order sheet image data.

In response to receipt of a user operation of selecting the electronic mail address displayed in a display area 133A on the screen 131A, the supplier terminal 400 may display an electronic mail creation screen for transmitting the invoice image data to the transaction management apparatus 200 to transmit the invoice image data to the electronic mail address.

On the screen 131A illustrated in FIG. 14A, the transmission guide information displayed in the display area 133A is represented by the electronic mail address. On the screen 131B illustrated in FIG. 14B, a display area 133B displays the electronic mail address of the buyer, and a display area 139 displays a message indicating that the electronic mail address displayed in the display area 133B has been specified as the transmission guide information.

In response to receipt of a user operation of replying to the electronic mail address (i.e., the transmission guide information) of the buyer terminal 300 on the screen 131B, the supplier terminal 400 may display the electronic mail creation screen for transmitting the invoice image data to the transaction management apparatus 200.

In the first embodiment, the electronic mail address may be specified as the transmission guide information, as described above.

A description will be given of an example of the storage management DB 230 in the case in which the electronic mail address is specified as the transmission guide information.

A process of the reconciliation management unit 270 in the transaction management apparatus 200 of the first embodiment will be described with reference to FIGS. 15 and 16.

When the buyer terminal 300 receives a user instruction to start the reconciliation work of reconciling the order sheet information with the invoice image data, the reconciliation management unit 270 of the first embodiment causes the buyer terminal 300 to display the reconciliation screen including the order sheet information and the invoice image data.

Figure 15:
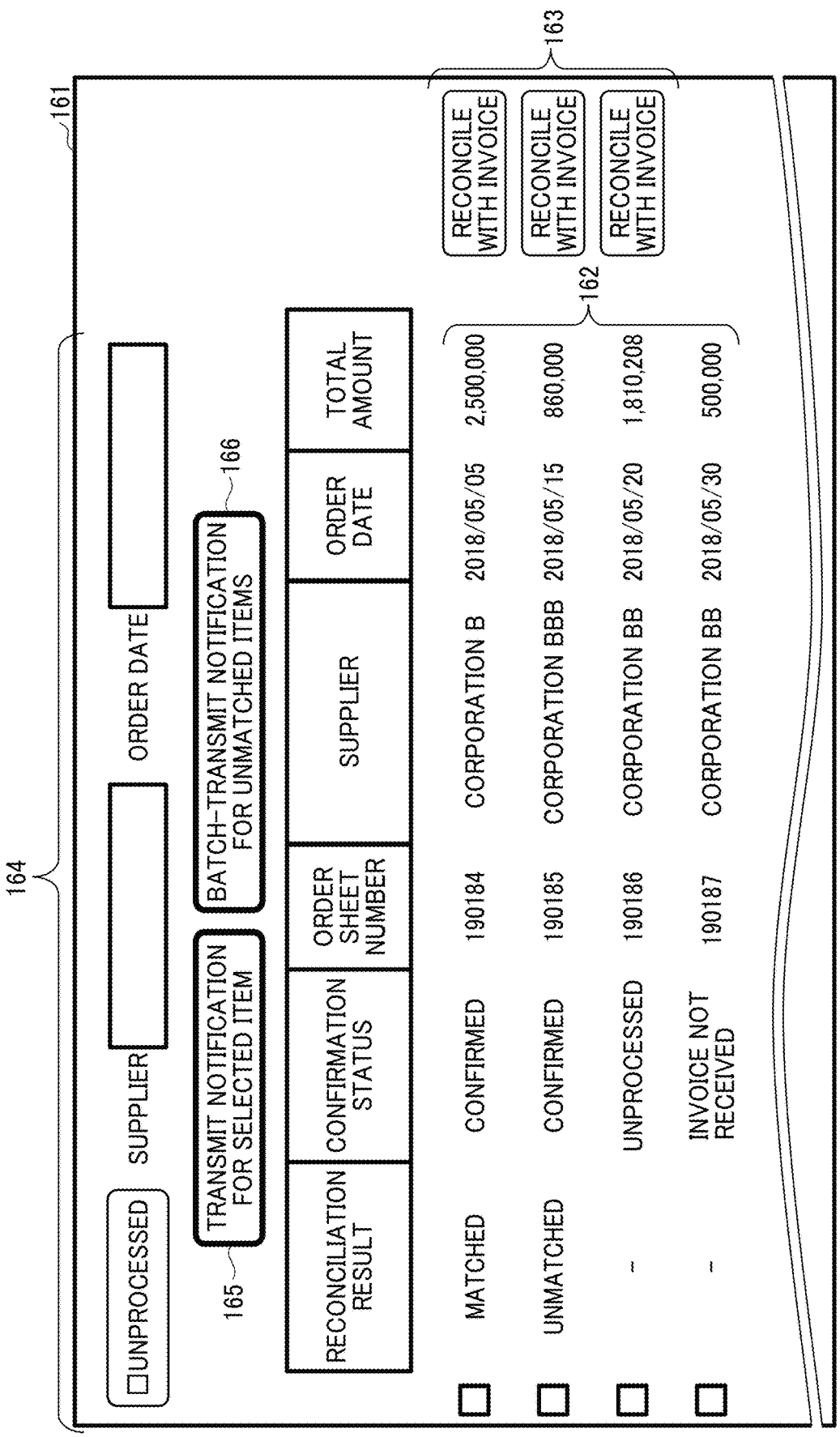
FIG. 15 is a diagram illustrating an example of a list screen of the first embodiment.

FIG. 15 is a diagram illustrating an example of a list screen of the first embodiment. A screen 161 illustrated in FIG. 15 is an example of the screen displayed on the buyer terminal 300. The screen 161 displays a list of order sheet information items. In the first embodiment, when the transaction management apparatus 200 receives a request to display the list of order sheet information items from the buyer terminal 300, the display control unit 264 may cause the buyer terminal 300 to display the screen 161.

The screen 161 includes a display area 162, operation buttons 163, an input field 164, and operation buttons 165 and 166.

The display area 162 displays a list of order sheet information items stored in the order sheet DB 220. In the display area 162, the order sheet information items and checkboxes for selecting the order sheet information items are displayed in association with each other.

Each of the operation buttons 163 is used to display the reconciliation screen for the corresponding order sheet information item.

The input field 164 is used to input extraction conditions for refining the list of order sheet information items to be displayed in the display area 162.

The operation buttons 165 and 166 are used to transmit a notification to the supplier in accordance with the result of the reconciliation work performed by the buyer.

When one of the operation buttons 163 is selected on the screen 161, the reconciliation screen is displayed which includes the order sheet information item displayed in association with the selected operation button 163 and the invoice image data associated with the order sheet information item. The operation button 163 may not be displayed if the order sheet number of the order sheet information item is not associated with the invoice image data in the storage management DB 230, i.e., if the transaction management apparatus 200 has not received the invoice image data from the supplier terminal 400, for example.

Further, the screen 161 may not display the operation button 163 for the order sheet information item in which the value of the item "confirmation status" is "confirmed."

The operation button 165 is used to transmit a notification of the reconciliation result to the supplier corresponding to the selected order sheet information item. If the operation button 165 is operated when the order sheet information item is selected in the display area 162, the buyer terminal 300 transmits a notification transmission request to the transaction management apparatus 200 to request to transmit the notification to the supplier corresponding to the selected order sheet information item.

In response to receipt of the notification transmission request, the transaction management apparatus 200 refers to the supplier management DB 210 and transmits the notification of the reconciliation result to the supplier corresponding to the selected order sheet information item. The reconciliation result may be input on the reconciliation screen, which will be described later. In the first embodiment, the order sheet information item in which the value of the item "confirmation status" is "unprocessed" may be displayed in an unselectable manner in the display area 162.

The operation button 166 is used to batch-transmit the notification to suppliers corresponding to order sheet information items in which the value of the item "reconciliation result" is "unmatched." The order sheet information items in which the value of the item "reconciliation result" is "unmatched" are order sheet information items determined as unmatched in the reconciliation work of reconciling the order sheet information with the invoice image data.

In response to receipt of the operation of the operation button 166, the buyer terminal 300 transmits a notification transmission request to the transaction management apparatus 200 to request to transmit the notification of the reconciliation result to the suppliers corresponding to the order sheet information items in which the value of the item "reconciliation result" is "unmatched."

In response to receipt of the notification transmission request, the transaction management apparatus 200 refers to the supplier management DB 210 and transmits the notification of the reconciliation result to the suppliers corresponding to the order sheet information items with the unmatched reconciliation results.

The reconciliation screen of the first embodiment will be described with reference to FIG. 16.

FIG. 16 is a diagram illustrating an example of the reconciliation screen of the first embodiment. A screen 171 illustrated in FIG. 16 is an example of the reconciliation screen displayed on the buyer terminal 300 in response to receipt of the operation of the operation button 163 corresponding to the order sheet information item including an order sheet number "190186" on the screen 161 in FIG. 15.

The screen 171 includes display areas 122B, 172, and 173 and operation buttons 174 and 175. The display area 122B displays the order sheet information to be subjected to the reconciliation work. The display area 172 displays the invoice image data associated with the order sheet information displayed in the display area 122B.

The display area 173 includes a display area 173a and a note field 173b. The display area 173a displays item names of the items included in the order sheet information and selection fields and input fields corresponding to the item names, for example.

In the display area 173a of the first embodiment, a user may select an item determined as unmatched in the reconciliation work, i.e., an item the value of which does not match between the order sheet information and the invoice image data, and may input the corresponding information described in the invoice. Further, in this case, the corresponding value included in the invoice image data may be input in the input field corresponding to the selected item in the display area 173a.

In the example of FIG. 16, the value of the order price displayed in a display field 122a of the display area 122B does not match the value of the total invoice amount displayed in a display field 172a of the display area 172. Further, in the example of FIG. 16, the value of the unit price in a description D1 displayed in a display field 122b of the display area 122B does not match the value of the unit price displayed in a display field 172b of the display area 172. Furthermore, the value of the price in the description D1 displayed in a display field 122c of the display area 122B does not match the value of the price displayed in a display field 172c of the display area 172.

On the screen 171, therefore, the items "total amount," "unit price in description D1," and "price in description D1"

are selected in the display area 173, and the values of these items included in the invoice image data are input in the input fields corresponding to the items.

Further, information such as detailed information about the item determined as unmatched in the reconciliation work is input in the note field 173b. The content of the notification to be transmitted to the supplier may also be input in the note field 173b.

The operation button 174 is used to temporarily save (i.e., store) the content input in the display area 173. The operation button 175 is used to transition the screen 171 to the screen 161 in FIG. 15.

In the first embodiment, if the operation button 175 is operated when a value is input in any of the input fields in the display area 173a, for example, the screen 171 transitions to the screen 161. In this case, the screen 161 may display the value "unmatched" in the item "reconciliation result" of the order sheet information item including the order sheet number "190186" to indicate that the reconciliation result is unmatched.

As described above, in the first embodiment, the image data of the invoice issued in response to the order sheet including the order sheet information input by the buyer is associated with the order sheet information, thereby facilitating the reconciliation work of reconciling the content of the order with the content of the invoice.

Further, in the first embodiment, the transmission guide information for transmitting the invoice issued in response to the order sheet is generated, and the invoice image data transmitted based on the transmission guide information is stored in association with the order sheet information. The first embodiment, therefore, facilitates the association between the order sheet information and the invoice image data. In the first embodiment described above, the order sheet image data is output together with the transmission guide information. However, the order sheet image data may not be output. Further, instead of the order sheet image data, the order sheet information may be output together with the transmission guide information. Further, in the above-described first embodiment, the invoice image data transmitted based on the transmission guide information is stored in association with the order sheet information. Alternatively, the invoice information transmitted based on the transmission guide information may be stored in association with the order sheet information or the order sheet image data.

A second embodiment of the present invention will be described below with reference to drawings.

The second embodiment is different from the first embodiment in that form recognition is performed on the invoice image data transmitted based on the transmission guide information to acquire the invoice information from the invoice image data and reconcile the order sheet information with the invoice information. The following description of the second embodiment will focus on the difference from the first embodiment. Functional units of the second embodiment similar to those of the first embodiment will be denoted with the same reference numerals as those used in the above description of the first embodiment, and description thereof will be omitted.

FIG. 17 is a diagram illustrating an example of the system configuration of a transaction management system of the second embodiment. A transaction management system 100A of the second embodiment includes a transaction management apparatus 200A and the terminal apparatus (i.e., buyer terminal) 300.

The transaction management apparatus 200A of the second embodiment includes the supplier management DB 210, the order sheet DB 220, the storage management DB 230, the reconciliation management DB 240, a history management DB 250, an invoice DB 280, and a transaction management unit 260A.

The history management DB 250 stores history information representing histories such as an order sheet issuance history and an invoice transmission history.

The invoice DB 280 stores, as the invoice information, the result of the form recognition performed on the invoice image data stored in the storage management DB 230.

The transaction management unit 260A performs the form recognition on the invoice image data and a reconciliation process of reconciling the order sheet information with the invoice information.

FIG. 18 is a diagram illustrating an example of the history management DB 250 of the second embodiment. The history management DB 250 of the second embodiment includes transmission history information 250-1 and transmitted image information 250-2. The transmission history information 250-1 represents the history of the process of transmitting the invoice image data from the supplier terminal 400. The transmitted image information 250-2 represents the invoice image data transmitted in each transmission process.

The transmission history information 250-1 includes information items "URL," "order sheet number," and "invoice upload ID." The transmitted image information 250-2 includes information items "invoice upload ID," "invoice image," "upload date and time," and "reissuance request notification."

In the transmission history information 250-1 and the transmitted image information 250-2, the item "invoice upload ID" is associated with the other items.

The value of the item "invoice upload ID" is identification information for identifying the process of transmitting (i.e., uploading) the invoice image data. The value of the item "invoice upload ID" is generated each time the invoice image data is uploaded from the supplier terminal 400.

The value of the item "upload date and time" represents the date and time of upload of the invoice image data. The value of the item "reissuance request notification" represents the date and time of notification of the request to reissue the invoice to the supplier terminal 400 from the transaction management apparatus 200.

In the example of FIG. 18, there are invoice upload IDs "190186001" and "190186002" for the order sheet number "190186." The example of FIG. 18 therefore indicates that the upload of the invoice image data has been executed twice for the order sheet number "190186."

The example of FIG. 18 further indicates that the first upload of the invoice image data for the order sheet number "190186" is on Jul. 20, 2018, and that the notification of the request to reissue the invoice is on Aug. 1, 2018.

FIG. 19 is a diagram illustrating an example of the invoice DB 280 of the second embodiment. The invoice DB 280 of the second embodiment includes information items "order sheet number," "invoice ID," "payer," "billing amount," "invoice date," "payment due date," "description information," and "payee account information," for example. The items "invoice ID" and "order sheet number" are associated with the other items.

In the following description, information including the values of the items "invoice ID" and "order sheet number" and the values of the other items associated with the items "invoice ID" and "order sheet number" in the invoice DB 280 may be described as the invoice information.

The value of the item "invoice ID" is form identification information for identifying the invoice. The value of the item "payer" represents the name of the payer of the invoice identified with the invoice ID. The respective values of the items "billing amount," "invoice date," and "payment due date" represent the billing amount, the invoice date, and the payment due date described in the invoice.

The item "description information" is associated with items representing the breakdown of the billing amount, such as the items "article code," "article name," and "quantity." The values of the item "description information" represent the breakdown of the billing amount.

The item "payee account information" is associated with items representing the payee account to which the billing amount is to be transferred, such as items "bank name," "branch name," "account type," and "account number." The values of the item "payee account information" represent the payee account to which the billing amount is to be transferred.

The information items included in the invoice information are not limited to those in the example illustrated in FIG. 19. The information items included in the invoice information may not include all items illustrated in FIG. 19, and may include an item other than those illustrated in FIG. 19.

Functions of the transaction management apparatus 200A of the second embodiment will be described with reference to FIG. 20.

Figure 20:
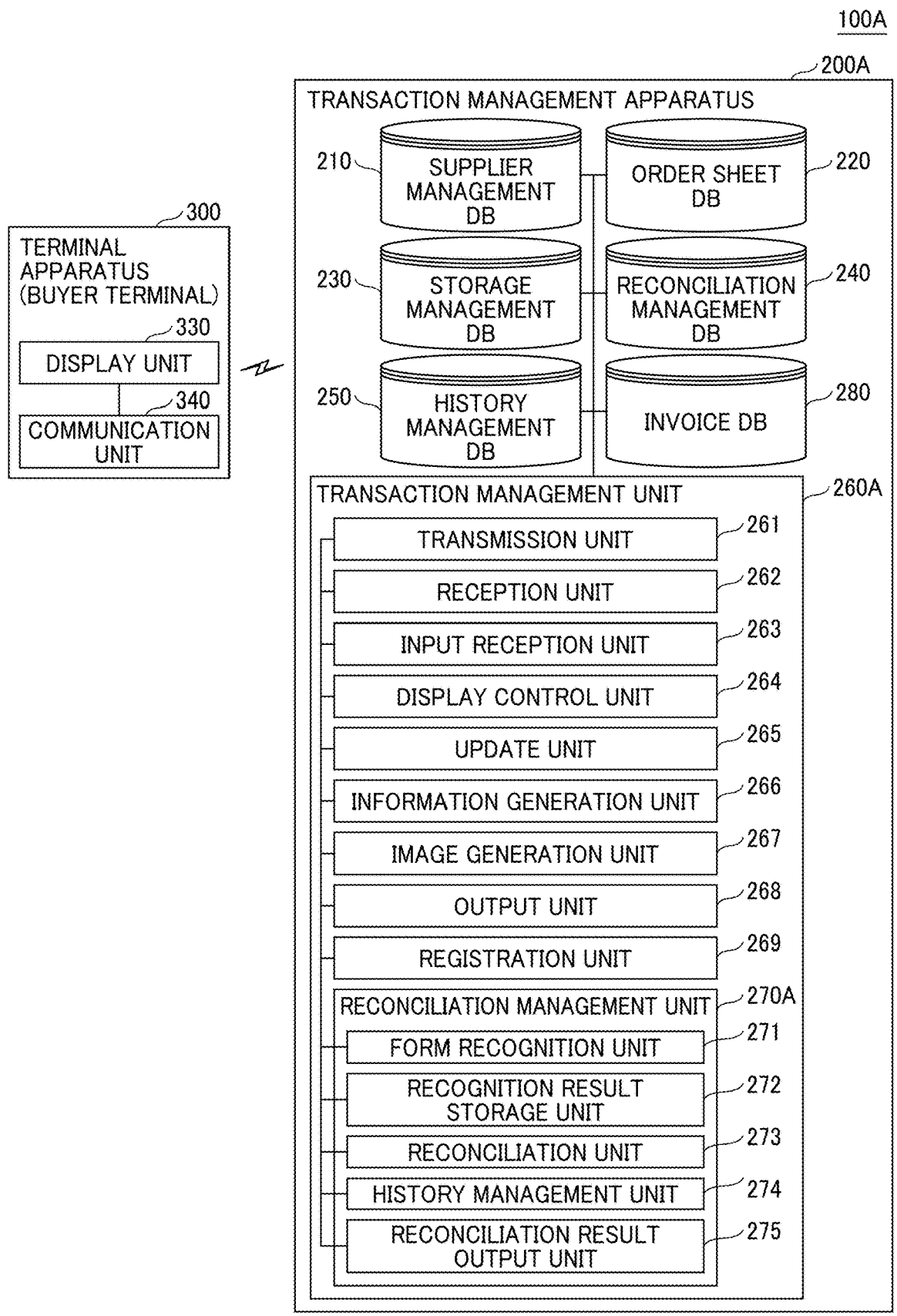
FIG. 20 is a diagram illustrating functions of a transaction management apparatus included in the transaction management system of the second embodiment.

FIG. 20 is a diagram illustrating functions of the transaction management apparatus 200A of the second embodiment. The transaction management unit 260A included in the transaction management apparatus 200A of the second embodiment includes the transmission unit 261, the reception unit 262, the input reception unit 263, the display control unit 264, the update unit 265, the information generation unit 266, the image generation unit 267, the output unit 268, the registration unit 269, and a reconciliation management unit 270A.

The reconciliation management unit 270A of the second embodiment includes a form recognition unit 271, a recognition result storage unit 272, a reconciliation unit 273, a history management unit 274, and a reconciliation result output unit 275.

The form recognition unit 271 of the second embodiment performs a form recognition process of extracting the names of the items (i.e., the item names) and the values of the items (i.e., the item values) from the form image represented by the form image data, converting the item names and the item values into text data, and associating the item names with the item values. Specifically, the form recognition unit 271 extracts the item names and the item values from the invoice image represented by the invoice image data, converts the item names and the item values into text data, and associates the item names with the item values.

The recognition result storage unit 272 stores, in the reconciliation result output unit 275, the result of the form recognition performed on the invoice image data by the form recognition unit 271. In the following description, the result of the form recognition by the form recognition unit 271 may be described as the invoice information.

The reconciliation unit 273 performs the reconciliation between the order sheet information and the invoice information. Specifically, the reconciliation unit 273 determines whether all items and the values of the items included in the order sheet information match the items and the values of the items included in the invoice information.

The history management unit 274 manages the history of the invoice image data transmitted in response to the order sheet information. Specifically, the history management unit 274 manages the history management DB 250.

The reconciliation result output unit 275 stores the result of the reconciliation process by the reconciliation unit 273 in the reconciliation management DB 240. The reconciliation result output unit 275 further outputs a notification according to the result of the reconciliation process.

An operation of the transaction management system 100A of the second embodiment will be described with reference to FIG. 21.

Figure 21:
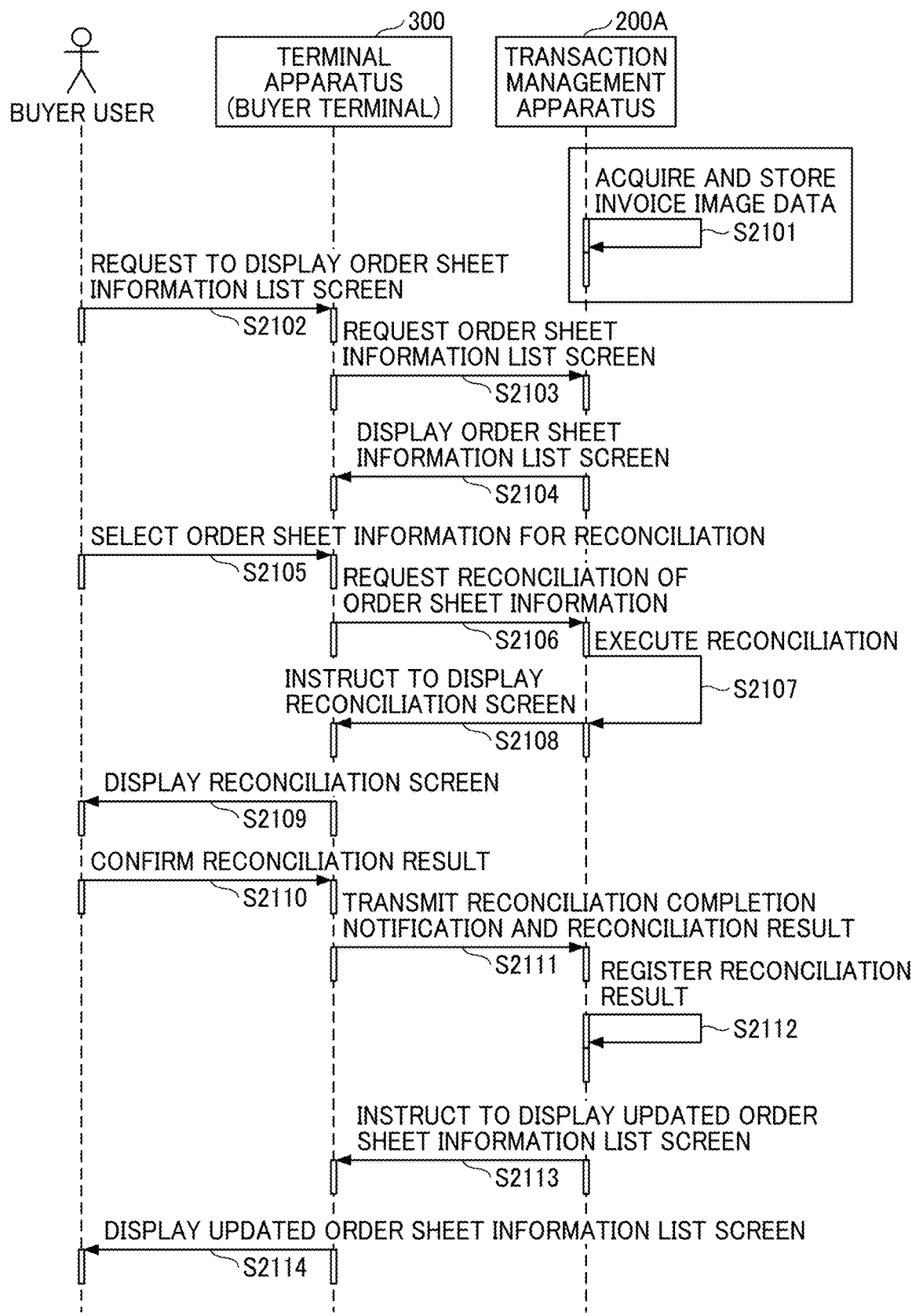
FIG. 21 is a sequence diagram illustrating an operation of the transaction management system of the second embodiment.

FIG. 21 is a sequence diagram illustrating an operation of the transaction management system 100A of the second embodiment. FIG. 21 illustrates an operation of the transaction management system 100A in the reconciliation process of the reconciliation management unit 270A.

In the transaction management system 100A, the transaction management apparatus 200A previously registers the invoice image data transmitted from the supplier terminal 400 in the storage management DB 230 (step S2101).

Then, the buyer terminal 300 receives a user request to display an order sheet information list screen (step S2102). The buyer terminal 300 then transmits a display request to the transaction management apparatus 200A to request to display the order sheet information list screen (step S2103).

In the transaction management apparatus 200A, in response to receipt of the display request, the display control unit 264 transmits an instruction to display the order sheet information list screen to the buyer terminal 300 to cause the buyer terminal 300 to display the order sheet information list screen (step S2104).

Then, the buyer terminal 300 receives, via the order sheet information list screen, a user selection of the order sheet information to be subjected to the reconciliation (step S2105). In response to receipt of the selection of the order sheet information, the buyer terminal 300 transmits a reconciliation request to the transaction management apparatus 200A to request to reconcile the selected order sheet information with the invoice information associated with the order sheet information (step S2106).

In the transaction management apparatus 200A, in response to receipt of the reconciliation request, the reconciliation unit 273 executes the reconciliation process of reconciling the order sheet information with the invoice information (step S2107). Details of the reconciliation process by the reconciliation unit 273 will be described later.

Then, in the transaction management apparatus 200A, the reconciliation result output unit 275 outputs the reconciliation result obtained by the reconciliation unit 273 to the display control unit 264, which then transmits a reconciliation screen display instruction including the reconciliation result to the buyer terminal 300 (step S2108). In response to receipt of the display instruction, the buyer terminal 300 displays the reconciliation screen (step S2109).

In response to receipt of an operation of confirming the reconciliation result performed by the buyer (i.e., the buyer user) (step S2110), the buyer terminal 300 transmits a notification to the transaction management apparatus 200A to notify that the reconciliation work with the visual inspection by the buyer has been completed (step S2111). In this process, information such as the result of the reconciliation work by the buyer may be input on the reconciliation screen. In this case, the information input on the reconciliation screen is also transmitted to the transaction management apparatus 200A as well as the notification of the completion of the reconciliation work.

In the transaction management apparatus 200A, the update unit 265 stores the reconciliation result in the reconciliation management DB 240 (step S2112).

Then, in the transaction management apparatus 200A, the display control unit 264 transmits a display instruction to the buyer terminal 300 to instruct to display the order sheet information list screen reflecting the reconciliation result (step S2113).

In response to receipt of the display instruction, the buyer terminal 300 displays the order sheet information list screen reflecting the reconciliation result (step S2114).

The reconciliation process of the reconciliation unit 273 will be described with reference to FIG. 22.

Figure 22:
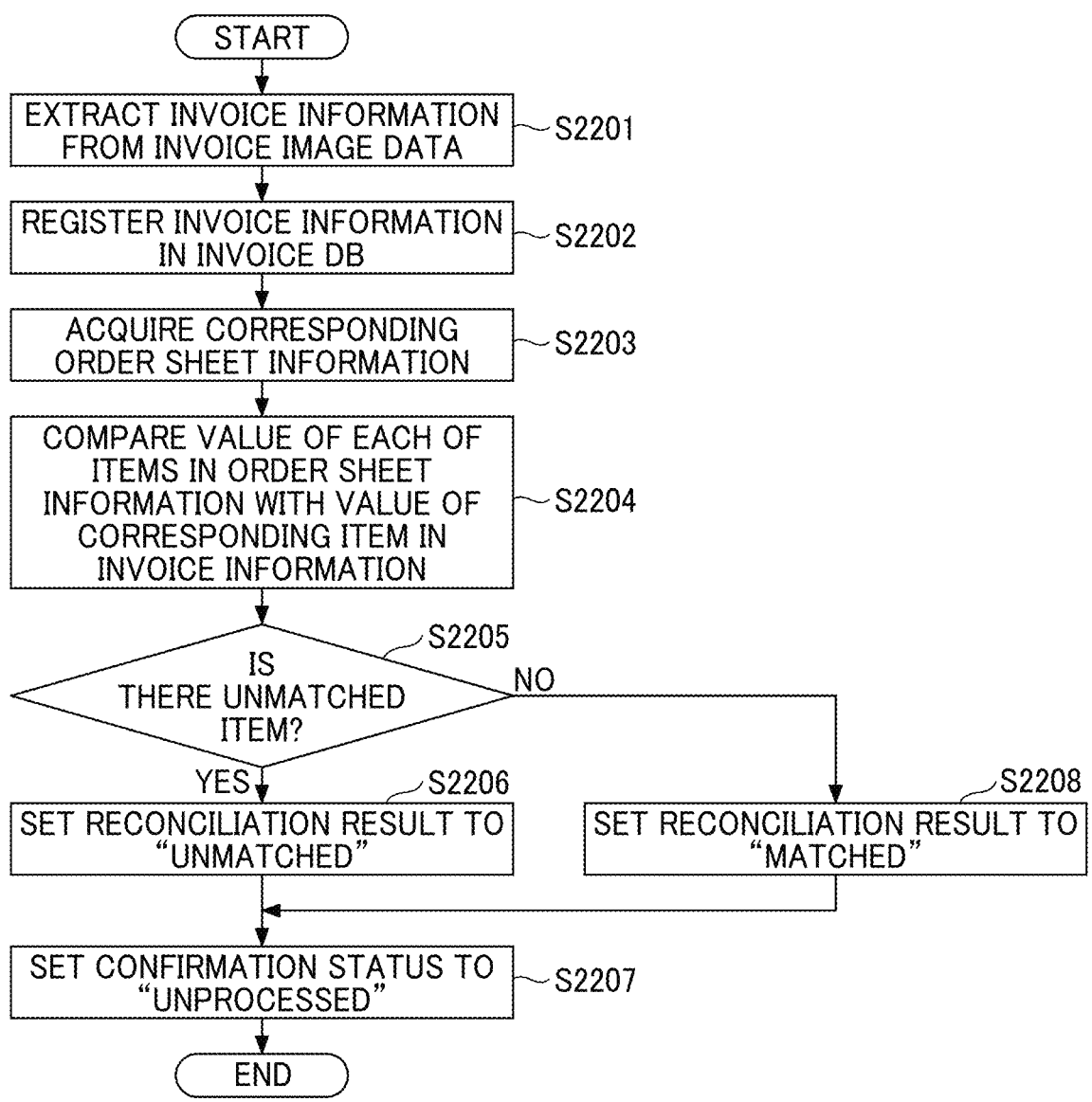
FIG. 22 is a flowchart illustrating a process of a reconciliation management unit in the transaction management apparatus of the second embodiment.

FIG. 22 is a flowchart illustrating the reconciliation process of the second embodiment. FIG. 22 illustrates details of the process of the reconciliation management unit 270A at step S2107 in FIG. 21.

In the reconciliation management unit 270A of the transaction management apparatus 200A, the form recognition unit 271 acquires the invoice image data corresponding to the selected order sheet information from the storage management DB 230, and performs the form recognition on the acquired invoice image data to acquire the invoice information from the invoice image data (step S2201).

The form recognition unit 271 then stores the invoice information in the invoice DB 280 (step S2202). Then, the reconciliation management unit 270A refers to the order sheet DB 220 and acquires therefrom the order sheet information to be subjected to the reconciliation, i.e., the order sheet information selected at step S2105 (step S2203).

Then, the reconciliation unit 273 of the reconciliation management unit 270A compares the value of each of the items included in the order sheet information with the value of the corresponding item included in the invoice information (step S2204). The reconciliation unit 273 then determines whether there is an item the value of which does not match between the order sheet information and the invoice information (step S2205).

If it is determined at step S2205 that there is an item the value of which does not match between the order sheet information and the invoice information (YES at step S2205), the reconciliation result output unit 275 sets the value of the item "reconciliation result" in the order sheet information to "unmatched" (step S2206). The reconciliation result output unit 275 then sets the value of the item "confirmation status" to "unprocessed" (step S2207). Then, the reconciliation management unit 270A completes the process of FIG. 22.

If it is determined at step S2205 that there is no item the value of which does not match between the order sheet information and the invoice information, i.e., that the values of all items match between the order sheet information and the invoice information (NO at step S2205), the reconciliation result output unit 275 sets the value of the item "reconciliation result" in the order sheet information to "matched" (step S2208). The reconciliation result output unit 275 then proceeds to the process of step S2207.

Display examples of the order sheet information list screen and the reconciliation screen of the second embodiment will be described with reference to FIGS. 23 to 26.

FIG. 23 is a diagram illustrating an example of the list screen of the second embodiment. A screen 161A illustrated in FIG. 23 is an example of the order sheet information list screen displayed on the buyer terminal 300 at step S2104 in FIG. 21.

The screen 161A includes a display area 162A, operation buttons 163A, the input field 164, and the operation buttons 165 and 166.

In the screen 161A, the display area 162A displays a list of order sheet information items and invoice information items extracted from invoice image data items corresponding to the order sheet information items. The display area 162A further displays checkboxes for selecting the order sheet information items and the invoice information items associated with the order sheet information items.

Each of the operation buttons 163A is used to instruct, for the corresponding order sheet information item, the execution of the reconciliation process to reconcile the order sheet information item with the corresponding invoice information item and the display of the reconciliation screen. The operation buttons 163A of the second embodiment include operation buttons 163a, 163b, and 163c, for example.

FIG. 24 is a diagram illustrating an example of the reconciliation screen of the second embodiment. A screen 171A illustrated in FIG. 24 is an example of the screen displayed on the buyer terminal 300 at step S2109 in FIG. 21.

More specifically, the screen 171 illustrated in FIG. 24 is an example of the reconciliation screen displayed on the buyer terminal 300 when the operation button 163c corresponding to the order sheet information item including the order sheet number "190186" is operated on the screen 161A in FIG. 23.

The screen 171A includes display areas 122C, 172A, and 173A and the operation buttons 174 and 175.

The display area 122C displays the order sheet information to be subjected to the reconciliation work. The display area 122C further includes an operation button 122d. In the second embodiment, when the operation button 122d is operated, the buyer terminal 300 may transmit an acquisition request to the transaction management apparatus 200A to request to acquire the order sheet image data corresponding to the order sheet information displayed in the display area 122C, and thereby may acquire and display the order sheet image data.

The display area 172A displays the invoice information extracted from the invoice image data by the form recognition unit 271. Specifically, the display area 172A displays the invoice information acquired from the invoice image data corresponding to the order sheet information including the order sheet number "190186."

The display area 172A further includes an operation button 172d. When the operation button 172d is operated, the buyer terminal 300 may transmit an acquisition request to the transaction management apparatus 200A to request to acquire the invoice image data corresponding to the invoice information displayed in the display area 172A, and thereby may acquire and display the invoice image data.

The display area 173A displays the result of the reconciliation process by the reconciliation unit 273 to reconcile the order sheet information displayed in the display area 122C with the invoice information displayed in the display area 172A.

The display area 173A includes the display field 173b and a display field 173c. The display filed 173c displays the values of the items included in the order sheet information and the values of the items included in the invoice information such that the values in the order sheet information and the values in the invoice information are displayed side by side for the respective items. The display field 173c further displays checkboxes corresponding to the respective items. If there is an item the value of which does not match between the order sheet information and the invoice information in the reconciliation process by the reconciliation unit 273, a check mark is displayed in the checkbox corresponding to the item.

As described above, in the second embodiment, the invoice information is acquired from the invoice image data, and the values of the items in the order sheet information are compared with the values of the corresponding items in the invoice information. Then, any item the value of which does not match between the order sheet information and the invoice information is identified and displayed. The second embodiment therefore facilitates the buyer to visually recognize whether the content of the order matches the content of the invoice.

Figure 25:
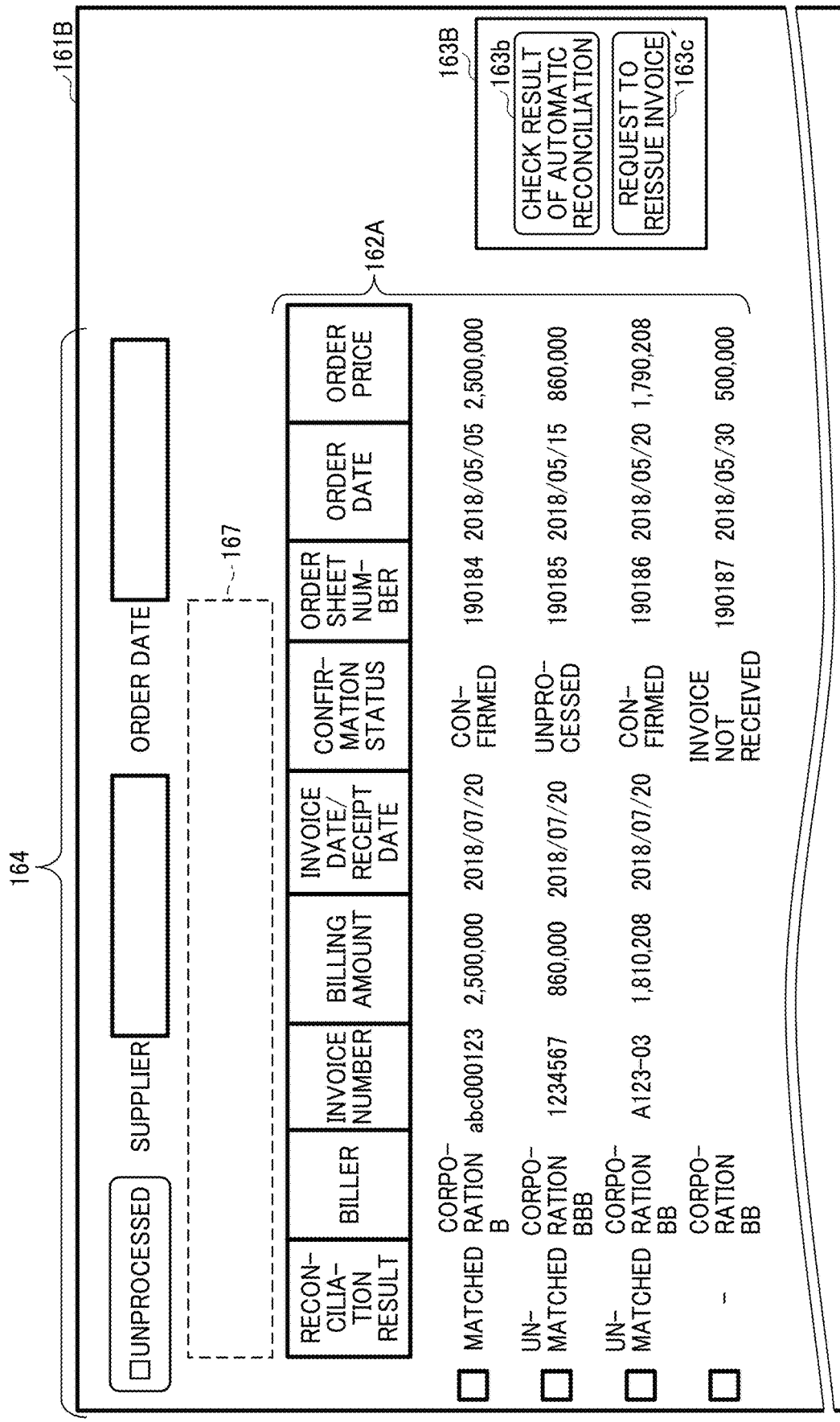
FIG. 25 is a diagram illustrating another example of the list screen of the second embodiment.

FIG. 25 is a diagram illustrating another example of the list screen of the second embodiment. A screen 161B illustrated in FIG. 25 is a list screen displayed when the invoice image data is received again after the transmission of a notification to the supplier (i.e., the biller) to notify of an unmatched item found in the reconciliation process of reconciling the selected order sheet information with the corresponding invoice information. The transmission destination of the notification is obtainable from the supplier management DB 210.

The screen 161B includes the display area 162A, operation buttons 163B, and the input field 164. The operation buttons 163B on the screen 161B include the operation button 163b for instructing the execution of the reconciliation process and the display of the reconciliation screen and an operation button 163c' for transmitting an invoice reissuance request to the supplier.

If the value of the item "reconciliation result" in the order sheet information is "matched," and if the value of the item "confirmation status" in the order sheet information is "confirmed," the screen 161B may not display the operation button for instructing the execution of the reconciliation process and the display of the reconciliation screen.

On the screen 161B, the result of the reconciliation between an order sheet information item including an order sheet number "190184" and the corresponding invoice information is "matched," and the confirmation status is "confirmed." Therefore, the operation buttons 163B displayed on the screen 161B do not include an operation button for the order sheet information item including the order sheet number "190184."

Further, if the value of the item "reconciliation result" is "unmatched," and if the value of the item "confirmation status" is "confirmed," the list screen 161B may display the operation button for transmitting the invoice reissuance request.

On the screen 161B, the result of the reconciliation between the order sheet information item including the order sheet number "190186" and the corresponding invoice information is "unmatched," and the confirmation status is "confirmed." The screen 161B therefore displays the operation button 163c' for transmitting the request to reissue the invoice corresponding to the order sheet information item including the order sheet number "190186."

As described above, in the second embodiment, the operation buttons to be included in the operation buttons 163B are changeable in accordance with the result of the reconciliation process by the reconciliation unit 273 and the status of confirmation work based on the visual inspection of the reconciliation result by the buyer.

Further, the operation buttons 165 and 166 displayed on the screen 161A in FIG. 23 are not displayed in a display area 167 on the screen 161B. The thus-configured screen 161B contributes to the reduction of human errors such as accidentally transmitting the notification requesting the reissuance of the invoice despite the matched reconciliation result, for example.

FIG. 26 is a diagram illustrating another example of the reconciliation screen of the second embodiment. A screen 171B illustrated in FIG. 26 is a reconciliation screen displayed when the invoice corresponding to the order sheet information item including the order sheet number "190186" is reissued in response to the selection of the operation button 163c' on the screen 161B in FIG. 25.

The screen 171B includes the display area 122C, display areas 172B and 173B, and the operation buttons 174 and 175.

In response to receipt of the request to reissue the invoice, the invoice information acquired from the invoice image data of the reissued invoice is displayed in the display area 172B.

Specifically, the invoice information displayed in the display area 172B includes an invoice date "2018/08/02," which indicates that the invoice information has been acquired after the acquisition of the invoice information displayed in the display area 172A on the screen 171A in FIG. 24.

The display area 172B further displays a form image path 172e of the invoice image data of the invoice issued in response to the order sheet information displayed in the display area 122C. When the form image path 172e is selected, the invoice image data of the previously issued invoice may be displayed on the screen 171B.

The display area 173B includes the display field 173c, the note field 173b, and an operation button 173e. The operation button 173e is used to request the reissuance of the invoice corresponding to the order sheet information displayed in the display area 122C.

In the second embodiment, with the operation button 173e provided on the screen 171B, the buyer is able to request the reissuance of the invoice without returning to the list screen from the reconciliation screen.

The management of the transmission history of the invoice image data in the case of the reissuance of the invoice will be described with reference to FIG. 18.

In the above-described example of FIGS. 23 to 26, the invoice is reissued when the content of the invoice initially issued in response to the order sheet information including the order sheet number "190186" does not match the content of the order sheet.

In this case, the history management unit 274 of the reconciliation management unit 270A assigns the invoice upload ID to each process of transmitting (i.e., uploading) the invoice image data corresponding to the order sheet number "190186," and associates the invoice upload ID with the order sheet number and the transmission guide information.

Then, the history management unit 274 associates the invoice upload ID, the invoice image data, and the upload date and time with each other.

In the second embodiment, the invoice image data of the reissued invoice is transmitted to the transaction management apparatus 200A from the supplier terminal 400 based on the transmission guide information for transmitting the first invoice image data.

In the transmission history information 250-1 of the history management DB 250 illustrated in FIG. 18, there are two invoice upload IDs corresponding to the order sheet number "190186." In this case, therefore, invoice upload IDs "1901860001" and "1901860002" are associated with the order sheet number "190186," which indicates that the transmission of the invoice image data has been executed twice.

Further, the transmitted image information 250-2 of the history management DB 250 in FIG. 18 indicates that the invoice image data transmitted in the transmission process corresponding to the invoice upload ID "1901860002" is more recent than the invoice image data transmitted in the transmission process corresponding to the invoice upload ID "1901860001."

That is, the invoice information displayed in the display area 172A on the screen 171A in FIG. 24 has been acquired from the invoice image data transmitted in the transmission process corresponding to the invoice upload ID "1901860001." Further, the invoice information displayed in the display area 172B on the screen 171B in FIG. 26 has been acquired from the invoice image data transmitted in the transmission process corresponding to the invoice upload ID "1901860002."

As described above, even if the invoice is reissued because of the unmatched reconciliation result, the invoice image data of the invoice issued in the past and the date and time of execution of the transmission process of the invoice image data are manageable in the second embodiment.

In the foregoing embodiments, the first form and the second form to be associated with each other are the order sheet and the invoice, respectively. The first form and the second form, however, are not limited to the order sheet and the invoice, respectively. The foregoing embodiments are applicable to any forms subjected to the reconciliation work of determining whether the forms match in content. Specifically, for example, the first form and the second form to be associated with each other may be the order sheet and the statement of delivery, respectively. Further, the first form and the second form may be the quotation and the order sheet, respectively.

The apparatuses described in each of the embodiments form one of a plurality of computing environments for implementing the embodiment disclosed in the present specification.

In an embodiment of the present invention, the transaction management apparatus 200 is a server cluster including a plurality of computing devices configured to communicate with each other via a desired type of communication link such as a network or a shared memory, for example, to execute the processes disclosed in the present specification. Similarly, the transaction management apparatus 200 may include a plurality of computing devices configured to communicate with each other.

Further, the transaction management apparatus 200 may be configured to share the disclosed process steps with another apparatus in various combinations. For example, a process executed by the transaction management apparatus 200 may be executed by another server. Similarly, a function of the transaction management apparatus 200 as a server may be executed by another server. Further, the components of the transaction management apparatus 200 as a server and the components of another server may be integrated in a single server, or may be distributed to a plurality of apparatuses.

The correspondence tables described in the present specification may be generated as a result of machine learning. Further, if keywords and items that may be included in a transaction description are categorized by machine learning, it is unnecessary to use the correspondence tables.

Herein, machine learning refers to a technology for causing a computer to acquire learning ability similar to human learning ability. According to the technology, the computer autonomously generates, from previously learned data, algorithms for making decisions such as data identification, and makes predictions by applying the algorithms to new data. The learning method for machine learning may be any of supervised learning, unsupervised learning, semi-supervised learning, reinforcement learning, and deep learning, or may be a combination of two or more of these learning methods. The learning method for machine learning is not limited to a particular method.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An information processing apparatus that communicates with a first terminal and a second terminal, the information processing apparatus comprising:
   circuitry; and
   a memory, wherein
   the circuitry is configured to:
      receive first form information from the first terminal,
      generate identification information for identifying the first form information,
      generate transmission guide information according to a second form issued in response to a first form that includes the first form information,
      store, in the memory, the first form information including the identification information for identifying the first form information,
      store, in the memory, the generated transmission guide information in association with the identification information for identifying the first form information, and
      register, in the memory, the second form transmitted from the second terminal based on the generated transmission guide information in association with the identification information for identifying the first form information.

2. The information processing apparatus of claim 1, wherein the circuitry is configured to output the generated transmission guide information.

3. The information processing apparatus of claim 2,
   wherein the circuitry is configured to output first form image data and the generated transmission guide information according to the second form issued in response to the first form, the first form image data representing the first form, and
   wherein the second form is second form image data representing the second form transmitted from the second terminal based on the transmission guide information.

4. The information processing apparatus of claim 3, wherein the first form image data includes the generated transmission guide information in addition to the first form information.

5. The information processing apparatus of claim 3, wherein the circuitry is configured to cause a display to display a screen including the first form information and the second form image data associated with the first form information.

6. The information processing apparatus of claim 5, wherein the circuitry is configured to:
execute form recognition on the second form image data to acquire second form information from the second form image data,
execute reconciliation between the first form information and the second form information, and
cause the display to display a screen including the first form information, the second form information, and a result of the reconciliation.

7. The information processing apparatus of claim 6, wherein the circuitry is configured to transmit, to an issuer of the second form, a notification according to the result of the reconciliation between the first form information and the second form information.

8. The information processing apparatus of claim 3, wherein the generated transmission guide information is associated with a storage location of the second form image data.

9. The information processing apparatus of claim 1, wherein the circuitry is configured to generate the transmission guide information in accordance with a method of transmitting the second form.

10. The information processing apparatus of claim 1, wherein
the generated transmission guide information is an address of a transmission screen used to transmit the second form, and
the circuitry is configured to cause the second terminal to display the transmission screen in response to a request from the second terminal.

11. The information processing apparatus of claim 1, wherein the circuitry is configured to:
perform form recognition on the second form to acquire second form information; and
determine whether values of items included in the first form information match values of items included in the second form information.

12. An information processing system comprising:
the information processing apparatus of claim 1; and
the first terminal,
wherein the first terminal includes a display that displays a screen including an input field for inputting the first form information and a selection field for selecting a method of transmitting second form image data.

13. An information processing system comprising:
circuitry configured to;
receive first form information from a first terminal,
generate identification information for identifying the first form information,
generate transmission guide information according to a second form issued in response to a first form that includes the first form information,
store, in a memory, the first form information including the identification information for identifying the first form information,
store, in the memory, the generated transmission guide information in association with the identification information for identifying the first form information,
register, in the memory, the second form transmitted from a second terminal based on the generated transmission guide information in association with the identification information for identifying the first form information, and
cause a display to display a screen including an input field for inputting the first form information and a selection field for selecting a method of transmitting second form image data.

14. An information processing method comprising:
receiving first form information from a first terminal;
generating identification information for identifying the first form information;
generating transmission guide information according to a second form issued in response to a first form that includes the first form information;
storing, in a memory the first form information including the identification information for identifying the first form information;
storing, in the memory, the generated transmission guide information in association with the identification information for identifying the first form information;
registering, in the memory, the second form transmitted from a second terminal based on the generated transmission guide information in association with the identification information for identifying the first form information.

15. The information processing method of claim 14, further comprising:
outputting the generated transmission guide information.

16. The information processing method of claim 15, wherein the outputting includes outputting the generated transmission guide information according to the second form issued in response to the first form and first form image data representing the first form, and
wherein the second form is second form image data representing the second form transmitted from the second terminal based on the transmission guide information.

17. The information processing method of claim 16, wherein the first form image data includes the generated transmission guide information in addition to the first form information.

18. The information processing method of claim 16, further comprising:
causing a display to display a screen including the first form information and the second form image data associated with the first form information.

19. The information processing method of claim 18, further comprising:
executing form recognition on the second form image data to acquire second form information from the second form image data;
executing reconciliation between the first form information and the second form information; and
causing the display to display a screen including the first form information, the second form information, and a result of the reconciliation.

20. The information processing method of claim 19, further comprising:
transmitting, to an issuer of the second form, a notification according to the result of the reconciliation between the first form information and the second form information.

21. The information processing method of claim 16, wherein the generated transmission guide information is associated with a storage location of the second form image data.

22. The information processing method of claim 14, wherein the generating includes generating the transmission guide information in accordance with a method of transmitting the second form.

\* \* \* \* \*